US012749221B2

(12) United States Patent
Qian et al.

(10) Patent No.: US 12,749,221 B2
(45) Date of Patent: Sep. 29, 2026

(54) EXTRINSIC CAMERA CALIBRATION USING CALIBRATION OBJECT

(71) Applicant: ObjectVideo Labs, LLC, Tysons, VA (US)

(72) Inventors: Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 343 days.

(21) Appl. No.: 17/967,409

(22) Filed: Oct. 17, 2022

(65) Prior Publication Data

US 2023/0128689 A1 Apr. 27, 2023

Related U.S. Application Data

(60) Provisional application No. 63/272,346, filed on Oct. 27, 2021.

(51) Int. Cl.
*G06T 7/80* (2017.01)
*G06T 3/60* (2024.01)
(Continued)

(52) U.S. Cl.
CPC ................. *G06T 7/80* (2017.01); *G06T 3/60* (2013.01); *G06T 7/60* (2013.01); *G06T 7/74* (2017.01);
(Continued)

(58) Field of Classification Search
CPC .... G06T 7/80; G06T 3/60; G06T 7/60; G06T 7/74; G06T 2207/20164;
(Continued)

(56) References Cited

U.S. PATENT DOCUMENTS 7,382,897 B2 6/2008 Brown et al.
7,901,095 B2 3/2011 Xiao et al.
(Continued)

FOREIGN PATENT DOCUMENTS

CN 108229488 A * 6/2018 ............... G06N 3/08
JP 2008154188 A * 7/2008

OTHER PUBLICATIONS

SuperPoint: Self-Supervised Interest Point Detection and Description (Year: 2018).*
(Continued)

*Primary Examiner* — Vu Le
*Assistant Examiner* — Zaid Muhammad Saleh
(74) *Attorney, Agent, or Firm* — Fish & Richardson P.C.

(57) ABSTRACT

Methods, systems, and apparatus, including computer programs encoded on computer storage media, for extrinsic camera calibration using a calibration object. One of the methods includes: determining physical locations of interest points of a calibration object in a calibration object centered coordinate system; determining pixel locations of the interest points in an image of the calibration object captured by a camera; determining, using the pixel locations and the physical locations, a transformation from the calibration object centered coordinate system to a camera centered coordinate system; and determining, using the transformation, a camera tilt angle and a camera mount height of the camera for use in analyzing images captured by the camera.

20 Claims, 9 Drawing Sheets

(51) Int. Cl.

| | |
|---|---|
| ***G06T 7/60*** | (2017.01) |
| ***G06T 7/73*** | (2017.01) |
| ***G06V 10/74*** | (2022.01) |
| ***G06V 10/75*** | (2022.01) |

(52) U.S. Cl.
CPC .......... *G06V 10/751* (2022.01); *G06V 10/761* (2022.01); *G06T 2207/20164* (2013.01)

(58) Field of Classification Search
CPC ........ G06T 2207/30204; G06V 10/751; G06V 10/761; G06V 10/25
See application file for complete search history.

(56) References Cited

U.S. PATENT DOCUMENTS

| | | | |
|---|---|---|---|
| 7,929,775 | B2 | 4/2011 | Hager et al. |
| 8,670,619 | B2 | 3/2014 | Funayama et al. |
| 10,467,756 | B2 * | 11/2019 | Karlinsky .............. G06N 20/00 |
| 10,726,570 | B2 | 7/2020 | DeTone et al. |
| 10,977,554 | B2 | 4/2021 | Rabinovich et al. |
| 11,062,209 | B2 | 7/2021 | DeTone et al. |
| 2014/0081456 | A1 | 3/2014 | Schaller et al. |
| 2014/0293043 | A1 * | 10/2014 | Datta ........................ G06T 7/60 348/135 |
| 2016/0119541 | A1 | 4/2016 | Alvarado-Moya et al. |
| 2018/0246312 | A1 | 8/2018 | Dai et al. |
| 2020/0074683 | A1 * | 3/2020 | Shen ......................... G06T 7/80 |
| 2022/0230410 | A1 | 7/2022 | Taheri et al. |

OTHER PUBLICATIONS

PCT International Search Report and Written Opinion in International Appln. No. PCT/US2022/078427, mailed on Jan. 26, 2023, 8 pages.

DeTone et al., "SuperPoint: Self-Supervised Interest Point Detection and Description," CVPRW, Apr. 19, 2018, 13 pages.

* cited by examiner

EXTRINSIC CAMERA CALIBRATION USING CALIBRATION OBJECT

CROSS-REFERENCE TO RELATED APPLICATION

This application claims the benefit of U.S. Provisional Application No. 63/272,346, filed on Oct. 27, 2021, the contents of which are incorporated by reference herein.

BACKGROUND

Many properties are equipped with monitoring systems that include sensors and connected system components. Some property monitoring systems include cameras.

SUMMARY

Some residents and homeowners equip their properties with monitoring systems to enhance the security, safety, or convenience of their properties. A property monitoring system can include cameras that can obtain visual images of scenes at the property. A camera can detect and localize objects within a field of view (FOV).

In home security and smart home applications, there are scenarios in which it is desirable to localize an object in the camera field of view or in an area of interest within the field of view. The object can be a doormat, a trashcan, a bench, etc. As an example, a touchless doorbell that includes a camera may have a region in a camera field of FOV that is monitored for human detection. If a human is detected standing in the region, the doorbell rings. To make the region well-defined, a doormat may be classified as the region of interest. The camera can localize the doormat in the camera FOV and monitor the doormat for a human standing event. When the camera detects that a person is standing on the doormat, the camera triggers the doorbell to ring.

The described techniques can be used to perform object localization without requiring a large corpus of data with annotations. Thus, object localization can be performed while reducing the amount of data and processing required. This can reduce the amount of data storage and power needed to perform object localization, and can also improve the speed of performing object localization.

The described techniques use a reference image of an object of interest to generate a model, or representation, of the object. The process for generating the object representation may also consider camera calibration parameters and camera FOV. The object representation can be generated using multiple homographic and photometric augmented images of the reference image. This approach provides a form of self-supervision which boosts the geometric and photometric consistency of interest points and their local descriptors. Aggregation of all these representations by mapping local descriptors to the reference image and fusing them will generate a robust model for the object.

The generated object representation can be used to localize the object in different conditions in FOV. For example, a camera can use the object representation to localize the object in various lighting conditions and weather conditions, and at various distances and orientations.

Techniques are described for extrinsic camera calibration using a calibration object. Accurate extrinsic camera parameters such as camera mount height from the ground and camera tilt angle can greatly enhance the accuracy of video analytics results.

However, obtaining such extrinsic camera parameters may involve going through a camera calibration process, which may not be available during camera installation due to complexity of the camera calibration process and limited time a dealer may have to finish the installation at customer sites.

The systems and techniques described in this specification can generate extrinsic camera parameters using a calibration object, such as a doormat. The systems and techniques can determine a transformation from a calibration object centered coordinate system to a camera centered coordinate system using pixel locations and physical locations of interest points of the calibration object. The systems and techniques can generate extrinsic camera parameters, such as camera mount height from the ground and camera tilt angle, using the transformation. Accordingly, a camera may be calibrated directly based on the appearance of the calibration object in an image captured by a camera.

In general, one innovative aspect of the subject matter described in this specification can be embodied in methods that include the actions of determining physical locations of interest points of a calibration object in a calibration object centered coordinate system; determining pixel locations of the interest points in an image of the calibration object captured by a camera; determining, using the pixel locations and the physical locations, a transformation from the calibration object centered coordinate system to a camera centered coordinate system; and determining, using the transformation, a camera tilt angle and a camera mount height of the camera for use in analyzing images captured by the camera.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The actions include matching one or more of the interest points in the calibrated object centered coordinate system with a corresponding interest point in the image of the calibrated object captured by the camera. Each interest point is associated with one or more descriptors, and matching the one or more of the interest points includes matching the one or more of the interest points in the calibrated object centered coordinate system with the corresponding interest point in the image of the calibrated object using a similarity of the respective associated one or more descriptors. Determining the physical locations of the interest points in the calibration object centered coordinate system includes: obtaining physical dimension of the calibrated object; obtaining pixel locations of the interest points in a reference image, wherein the reference image is captured with a second camera that is centered above the calibration object, wherein the calibration object fills an entirety of the reference image; and determining the physical locations of the interest points using the physical dimension of the calibrated object and the pixel locations of the interest points in the reference image.

The reference image is captured with the second camera that is at a tilt angle of ninety degrees from horizon. The actions include obtaining intrinsic camera parameters; and determining the transformation using the pixel locations, the physical locations, and the intrinsic camera parameters. Determining the transformation from the calibration object centered coordinate system to the camera centered coordinate system includes: determining, using the pixel locations and the physical locations, a rotation matrix that indicates a rotation from the calibration object centered coordinate system to the camera centered coordinate system; and determining, using the pixel locations and the physical locations, a location vector that indicates a translation from the calibration object centered coordinate system to the camera centered coordinate system. Determining the transformation includes: determining an initial solution using a linear transformation from the calibration object centered coordinate system to the camera centered coordinate system; and determining the rotation matrix and the location vector by optimizing the initial solution using a non-linear least square method. The actions include obtaining respective pixel locations of the interest points in at least one additional image of the calibration object captured by the camera; and determining, for each of the image and the at least one additional image, a respective transformation using: a) the pixel locations of the interest points in each image and the physical locations, and b) a relationship of the transformations among the image and the at least one additional image. The actions include analyzing a target image captured by the camera using the camera tilt angle and the camera mount height. Analyzing the target image includes at least one of estimating a distance between the camera and an object depicted in the target image and localizing a footprint of the object.

The subject matter described in this specification can be implemented in various implementations and may result in one or more of the following advantages. In some implementations, the systems and methods described in this specification can generate more accurate extrinsic camera parameters using a transformation from a calibration object centered coordinate system to a camera centered coordinate system compared to other systems. The transformation can be determined using a calibration object. In some implementations, the systems and methods can use multiple images of the same calibration object placed at different locations to improve the accuracy of the extrinsic camera parameters. In some implementations, the systems and methods described in this specification can use the more accurate extrinsic camera parameters in video analytics tasks, such as camera-object distance estimation, object footprint localization, etc., and can improve the accuracy of the results of the video analytics tasks, which can be important for rule-based event monitoring.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements

DETAILED DESCRIPTION

Figure 1:
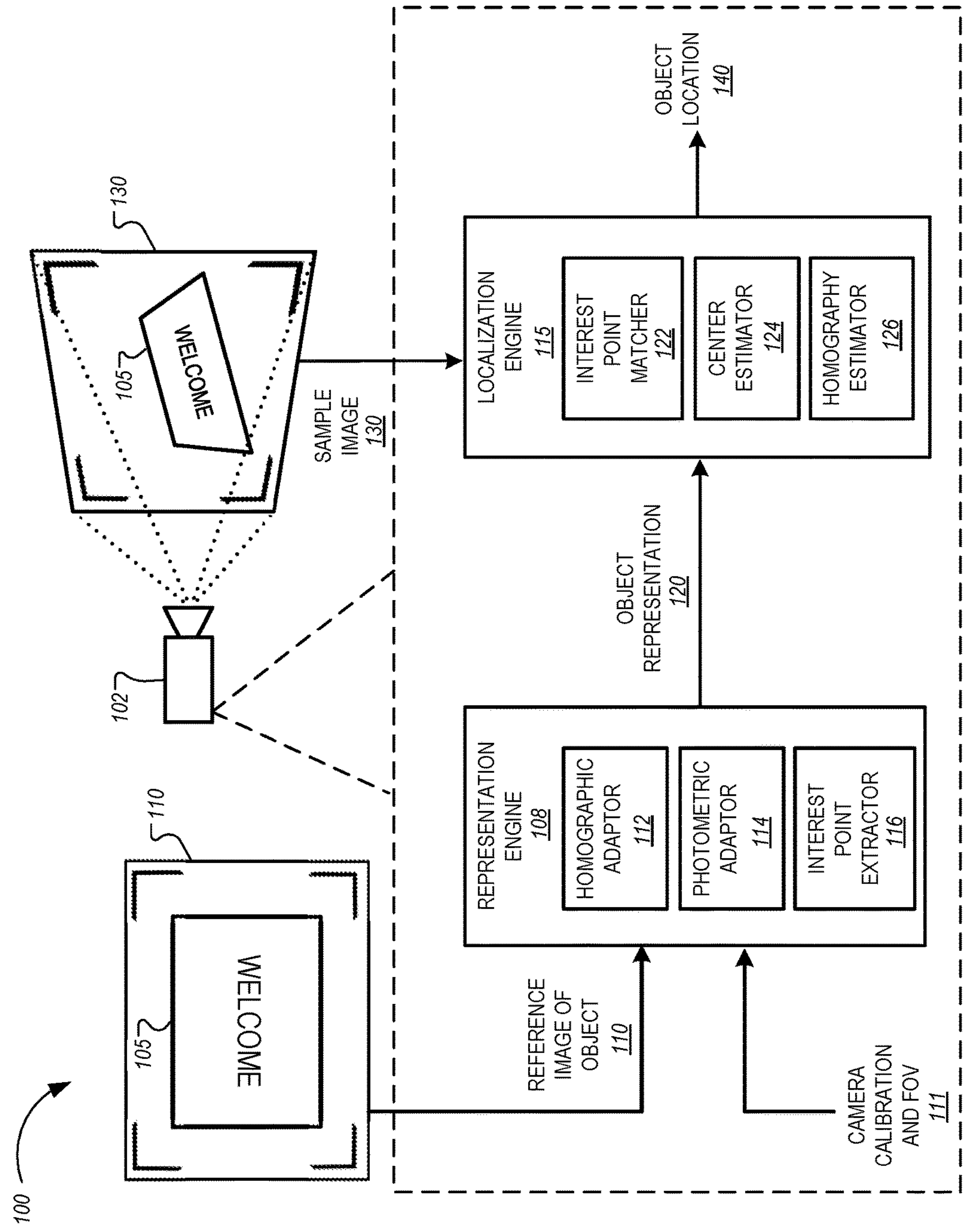
FIG. 1 illustrates an example system for object localization in video.

FIG. 1 illustrates an example system 100 for object localization in video.

The system 100 includes a camera 102 that captures video. The video includes multiple image frames captured over time. The camera 102 can perform video analysis on the video. Video analysis can include detecting, identifying, and tracking objects in the video.

The camera 102 can localize objects in the video. For example, the camera 102 can determine a shape, size, and orientation of an object in image frames of the video. The location of an object in an image frame can be described using pixel locations. For example, the image frame may include a grid of pixels having an x-axis and a y-axis. The location of each pixel may correspond to a respective x value and y value of the grid. The camera 102 can localize the object by determining locations of features of the object such as a center, edges, corners, etc.

The camera 102 includes a representation engine 108. The representation engine 108 generates an object representation 120 from a reference image 110 using camera calibration and field of view (FOV) 111. The representation engine 108 includes a homographic adaptor 112, a photometric adaptor 114, and an interest point extractor 116.

The reference image is an image of an object that is to be localized by the camera 102. For example, the reference image 110 includes an object 105 that is a doormat. The doormat includes text of the word "WELCOME." The camera 102 generates a representation of the doormat in order to localize the doormat in video. When the location of another object overlaps with the location of the doormat, the camera 102 may perform an action. For example, when a package is left on the doormat, and the location of the package overlaps with the location of the doormat, the camera 102 may send an instruction to activate a doorbell chime. In another example, when a person steps on the doormat, the camera 102 may send an instruction to illuminate a porch light.

From the reference image 110, the representation engine 108 can determine features of the object 105. For example, the representation may determine a size and shape of the object 105. Though the example object illustrated in FIG. 1 is a quadrilateral shape, the process for generating an object representation can be used for objects having other planar shapes. For example, the processes for localizing objects in video can be applied to an object having another polygonal shape such as a triangular, pentagonal, hexagonal, or octagonal shape. In some examples, the processes for localizing objects in video can be applied to an object having a non-polygonal shape such as a circular, semicircular, oblong, or elliptical shape.

The representation engine 108 receives camera calibration data and the camera FOV 111. Camera calibration data can include intrinsic and extrinsic camera parameters. For example, camera calibration data can include camera height, focal length, imaging plane position, orientation, tilt, lens distortion, etc. The camera FOV can include an angular FOV of the camera, an optical axis of the camera 102, and a range of the camera 102.

The object representation 120 includes a robust local representation for the object 105. The robust local representation includes a set of robust interest points that are selected based on aggregated probability and repeatability. A process for generating the object representation 120 is described in greater detail with reference to FIG. 2.

The camera 102 includes a localization engine 115 that determines an object location 140 in a sample image 130 based on the object representation 120. The localization engine 115 includes interest point matcher 122, a center estimator 124, and a homography estimator 126.

The sample image 130 may be an image captured by the camera 102. For example, the sample image 130 may be an image of the object 105 positioned in an area that is monitored by the camera 102. As an example, the sample image 130 may be an image of the doormat on a porch of a property.

The object location 140 can include pixel coordinates of features of the object 105. For example, the object location 140 can include pixel coordinates of a center of the object 105, pixel coordinates of corners of the object 105, etc. A process for determining the object location 140 is described in greater detail with reference to FIG. 3

Figure 2:
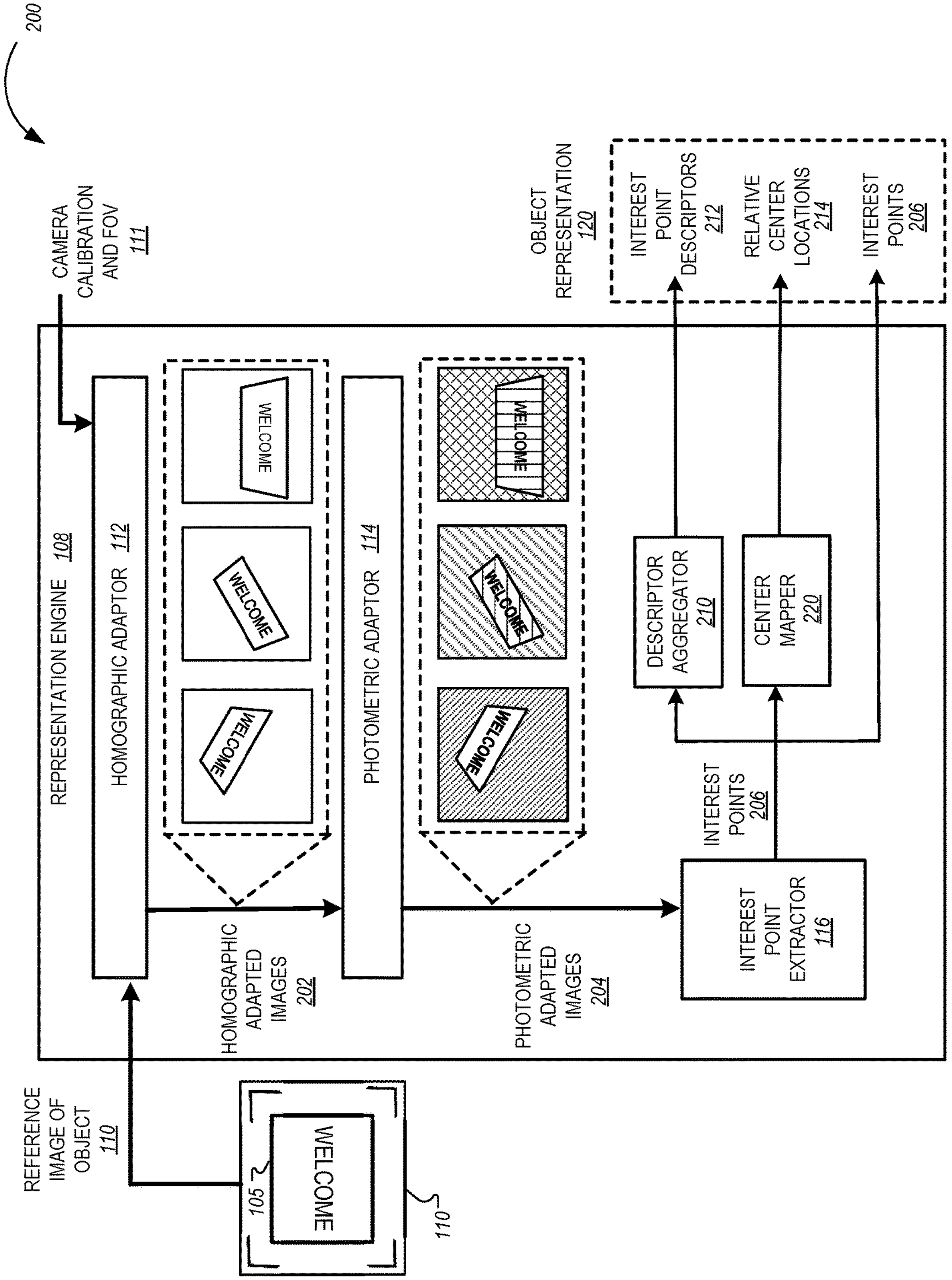
FIG. 2 illustrates an example system for generating a representation of an object using homographic adaptation.

FIG. 2 illustrates an example system 200 for generating a representation of an object using homographic adaptation.

The homographic adaptor 112 generates various homographic augmentations of the object 105. For example, the homographic adaptor 112 can generate homographic adapted images 202. The homographic adaptor 112 uses the calibration camera and FOV 111 to generate the homographic adapted images 202. Based on the camera calibration parameters, the reference image of the object 105 is projected to the camera FOV. The projection process simulates an image recording using the camera 102. For example, if the camera has lens distortion or if any de-warping algorithm is applied to the image before the image being recorded, those steps are considered in the homographic augmentation of the object 105. By varying the parameters regarding camera height and tilt and object distance from the camera, multiple homographic adaptations of the object 105 are created.

The homographic adaptations simulate various scenarios of object 105 placement in the camera FOV. For example, the homographic adapted images can depict the object at various ranges to the camera, e.g., closer to the camera and further from the camera. The homographic adapted images can also depict the object in rotated or tilted positions. The homographic adapted images can also depict the object in various locations of the FOV, e.g., near a center of the FOV, to the right of center, to the left of center, near a corner of the FOV, etc.

The photometric adaptor 114 generates various photometric adaptations of the object 105. For example, the photometric adaptor 114 can generate photometric adapted images 204 from the homographic adapted images 202. The photometric adapted images 204 are generated by applying local and global illumination augmentation. Illumination augmentation can include random changes in the brightness or contrast of the image, adding shade, adding highlights, etc.

In some implementations, photometric adaptation may be performed before homographic adaptation. In some implementations, homographic adaptation may be performed, and photometric adaptation might not be performed. In some implementations, photometric adaptation may be performed, and homographic adaptation might not be performed. Once the adapted images are generated, local descriptors are then extracted from the homographic and photometric augmented versions of the object 105 and are projected back to the reference image.

The interest point extractor 116 extracts interest points 206 and corresponding descriptors from the photometric adapted images 204. An interest point is a distinctive point that can be mapped between images. An interest point can be, for example, a point in an image where a significant change of an image property occurs. For example, an interest point can be a point in an image where a significant change in color, intensity, or texture occurs. Example interest point can be corners or edges of features of an image. By identifying interest points, an image processing system can map features between multiple images taken from different positions or at different times, in order to estimate parameters describing geometric transforms between images. In the example of FIG. 1, example interest points can correspond to any distinctive visible features of the doormat, such as edges of letters of the word "WELCOME." An interest point 206 can be represented, for example, by a two-dimensional pixel coordinate location of the center of the interest point.

The extracted interest points are aggregated over the photometric adapted images and projected back to the reference image 110. By aggregating over multiple images, the interest point extractor 166 extracts interest points with high stability and repeatability. To aggregate the information from multiple images, the interest point extractor 116 determines a probability of each interest point as well as the frequency of detecting a particular interest point at a particular location.

The probability is a measure of the strength of that interest point. The frequency is a measure of repeatability of the interest point. A strong interest point with a high probability is an interest point that has a well-defined position on a region of the object 105. The well-defined position of the interest point is stable under local and global perturbations in the image such as illumination and brightness variations.

Both the criteria of probability and frequency are used in order to generate robust representation for the object 105. The interest points are sorted and filtered based on their aggregated strength and repeatability. The interest point extractor 116 then selects interest points that meet probability and repeatability criteria, in order to obtain a set of robust interest points on the reference image 110. In some implementations, the criteria can include a threshold probability score, a threshold repeatability score, or both. Interest points with scores above the threshold scores may be selected, while interest points with scores below the threshold scores may be discarded.

The interest point extractor provides interest points to a descriptor aggregator 210 and a center mapper 220. As the interest points are aggregated from the homographic and photometric augmentations, the descriptor aggregator 210 aggregates descriptors for each interest point in the augmented images. The descriptors can include feature vectors describing the distinguishable appearance of local regions around each interest point. In some examples, local descriptors can be obtained using computer vision algorithms such as SIFT, SURF, and ORB. In some examples, local descriptors can be deep descriptors obtained using deep learning methods such as SuperPoint, UnsuperPoint, and KP2D and so on.

The descriptor aggregator 210 aggregates the descriptors per interest point and generates a list of interest point descriptors 212. Since the interest point descriptors 212 are generated based on homographic and photometric adapted images, the descriptors can include descriptions of scale, gradient change, illumination, brightness, contrast, shade, orientation, distance from camera, etc.

Because the selected interest points have high frequency, the size of the descriptor list per interest point may be large. To compress the representation per interest point, the descriptor aggregator can apply a clustering algorithm, e.g. density-based spatial clustering of applications with noise (DBSCAN), to the list of descriptors per interest point. The descriptor aggregator 210 can then replace the list with descriptors for the center of the clusters. This produces a robust and compressed local representation model for the object 105. Other approaches like principal component analysis (PCA) or dictionary learning can be employed as well to learn a representative subspace for each interest point. In this way, descriptors for an interest point can describe the local region around the feature point.

The center mapper 220 identifies the relative center locations 214 for each interest point relative to the center of the object in the reference image 110. The center mapper 220 may determine a location of the object center in the reference image 110, e.g., using geometric computations. The geometric computations of the object center can be based on properties (shape, size, etc.) of the object 105. To obtain the relative center location, the center mapper 220 determines the relative location of the computed object center with respect to each interest point 206.

In some examples, the relative center location can be a two-dimensional pixel offset between the interest point and the center of the object. For example, for an object center positioned at coordinate [x1,y1] and an interest point positioned at coordinate [x2,y2], the relative center location can be represented as an offset [x2−x1,y2−y1]. The relative center location information is linked to each local descriptor and is maintained after the descriptor compression process.

The object representation 120 includes the interest points 206 projected back to the reference image 110. Each interest point is linked to the corresponding interest point descriptors 212 and the relative center location 214. The object representation 120 is a robust local representation for the object 105.

Figure 3:
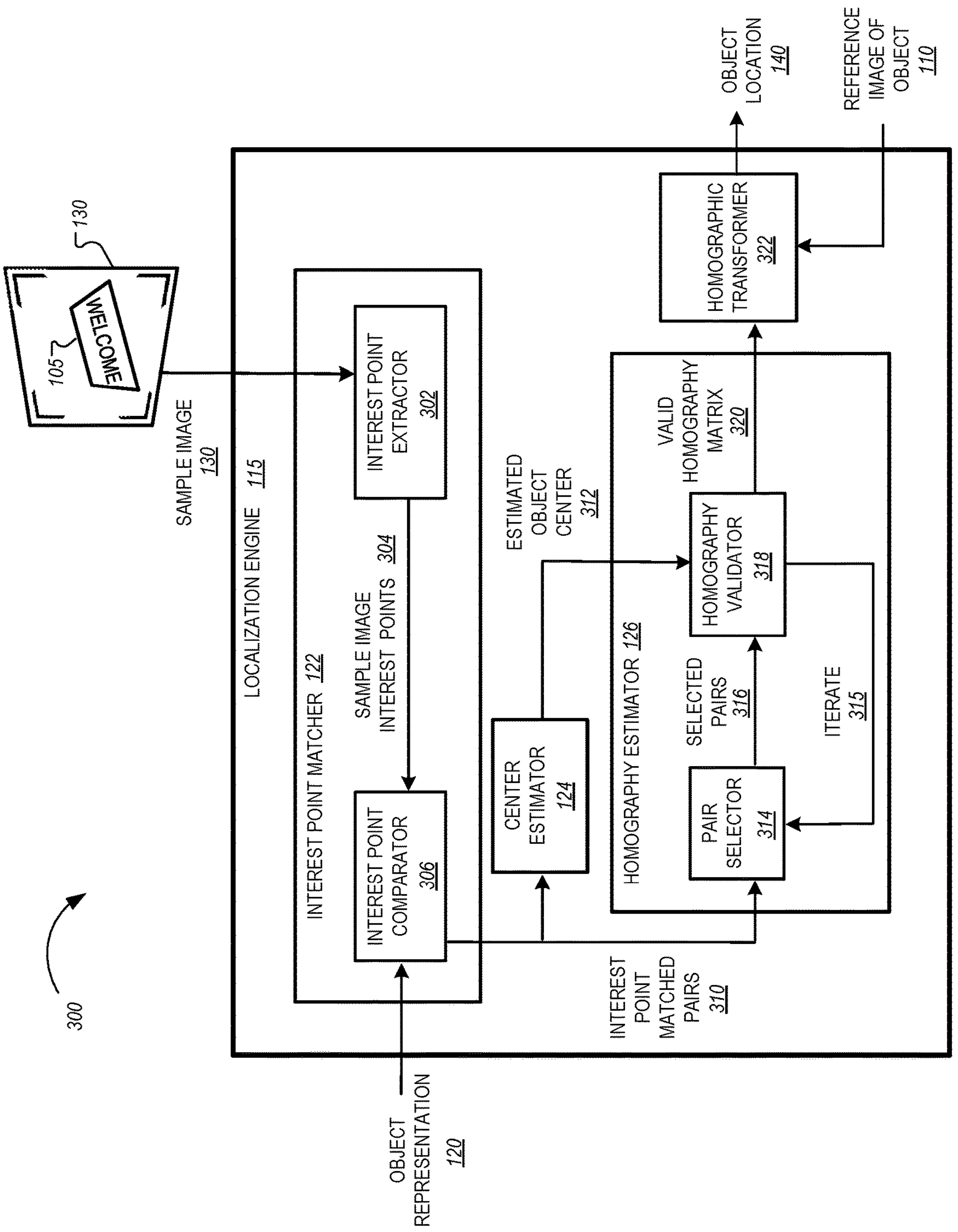
FIG. 3 illustrates an example system for localizing an object in a sample image using the generated representation.

FIG. 3 illustrates an example system 300 for localizing an object in a sample image using the generated object representation 120.

Given a sample image 130 that includes a depiction of the object 105 in it, the localization engine 115 can localize the object 105. The localization engine can localize the object 105 by determining a valid homography matrix 320 that maps the object 105 in the reference image 110 to the depiction of the object 105 in the sample image 130. The homography matrix 320 can be, for example, a 3×3 matrix that transforms a set of planar points in the reference image 110 to another set of planar points in the sample image 130. By applying the homography matrix 320 to the reference image 110, the localization engine can obtain the object location 140 within the sample image 130.

The localization engine 115 localizes the object 105 using the interest point matcher 122, the center estimator 124, and the homography estimator 126. The interest point matcher 122 includes an interest point extractor 302 and an interest point comparator 306. The interest point extractor 302 extracts local interest points and their descriptors from the sample image 130 in the same way that the interest point extractor 116 extracts interest points and their descriptors from the adapted images. The interest point extractor 302 provides sample image interest points 304 to the interest point comparator 306.

The interest point comparator 306 compares the sample image interest points 304 to the object representation 120. The interest point comparator 306 generates interest point matched pairs 310. An interest point matched pair includes an interest point from the sample image 130 and a matching interest point from the object representation 120. Matching interest points can be interest points that have the same or similar descriptors. For example, a similarity between the descriptors may meet similarity criteria. The interest point comparator 306 outputs the interest point matched pairs 310, including the descriptor information for the matched pairs.

The center estimator 124 determines an estimated object center 312 based on the interest points matched pairs 310. The center estimator 124 uses the relative center information associated with the matched descriptors to estimate the center location of the object 105 in the sample image 130. Because the object representation 120 includes relative center locations 214 for each interest point, each matched descriptor may include an estimated location of the object center relative to the respective interest point. The center estimator 124 can use the relative center information and the position of the matched interest point from the object representation to estimate the position of the center of the object 105 in the sample image 130.

For example, a particular interest point matched pair includes a particular sample image interest point and a particular matching interest point from the object representation 120. The particular matching interest point from the object representation 120 includes relative center location information indicating an offset of the center of the doormat relative to the particular matching interest point. Based on the position of the particular sample image interest point in the sample image 130, and the relative position of the center of the object relative to the particular matching interest point in the object representation 120, the center estimator 124 can estimate a center location of the doormat in the sample image 130.

The center estimator 124 can repeat estimating the center location of the object 105 in the sample image based on descriptors for multiple interest point matched pairs 310. The center estimator 124 can then cluster the multiple estimated locations using a clustering algorithm like DBSCAN to find the biggest cluster where the center estimates are located. The centroid of this largest cluster provides an estimated object center 312. Because the estimated object center 312 is determined from a number of interest point matched pairs 310, the estimated object center is well localized.

The homography estimator 126 generates a homography matrix based on the interest point matched pairs 310 and the estimated object center 312. The homography estimator 126 can use a random sample consensus (RANSAC)-based approach to obtain a robust and accurate estimate of the homography matrix.

The inputs to the homography estimator 126 include the interest point matched pairs 310 and the estimated object center 312. In some examples, the homography estimator 126 may receive additional information such as an area of interest of the sample image 130 where the object 105 is expected to be. For example, for a camera field of view that includes a porch, the doormat may be expected to be located on the porch. Thus, the porch may be identified as an area of interest. Other additional inputs to the homography estimator 126 can include an estimated size of the object 105. The estimated size of the object may be based on previous localizations of the object 105.

The homography estimator 126 includes a pair selector 314 and a homography validator 318. The pair selector 314 selects matched pairs and outputs the selected pairs 316 to the homography validator 318. The homography validator 318 computes homographies based on the selected pairs 316 and computes a score for each estimated homography using an iterative RANSAC process 315. The homography validator 318 can rank the homographies based on their homography scores. A process for validating homography estimates, computing homography scores, and generating a valid homography matrix 320 is described with reference to FIG. 4.

Figure 4:
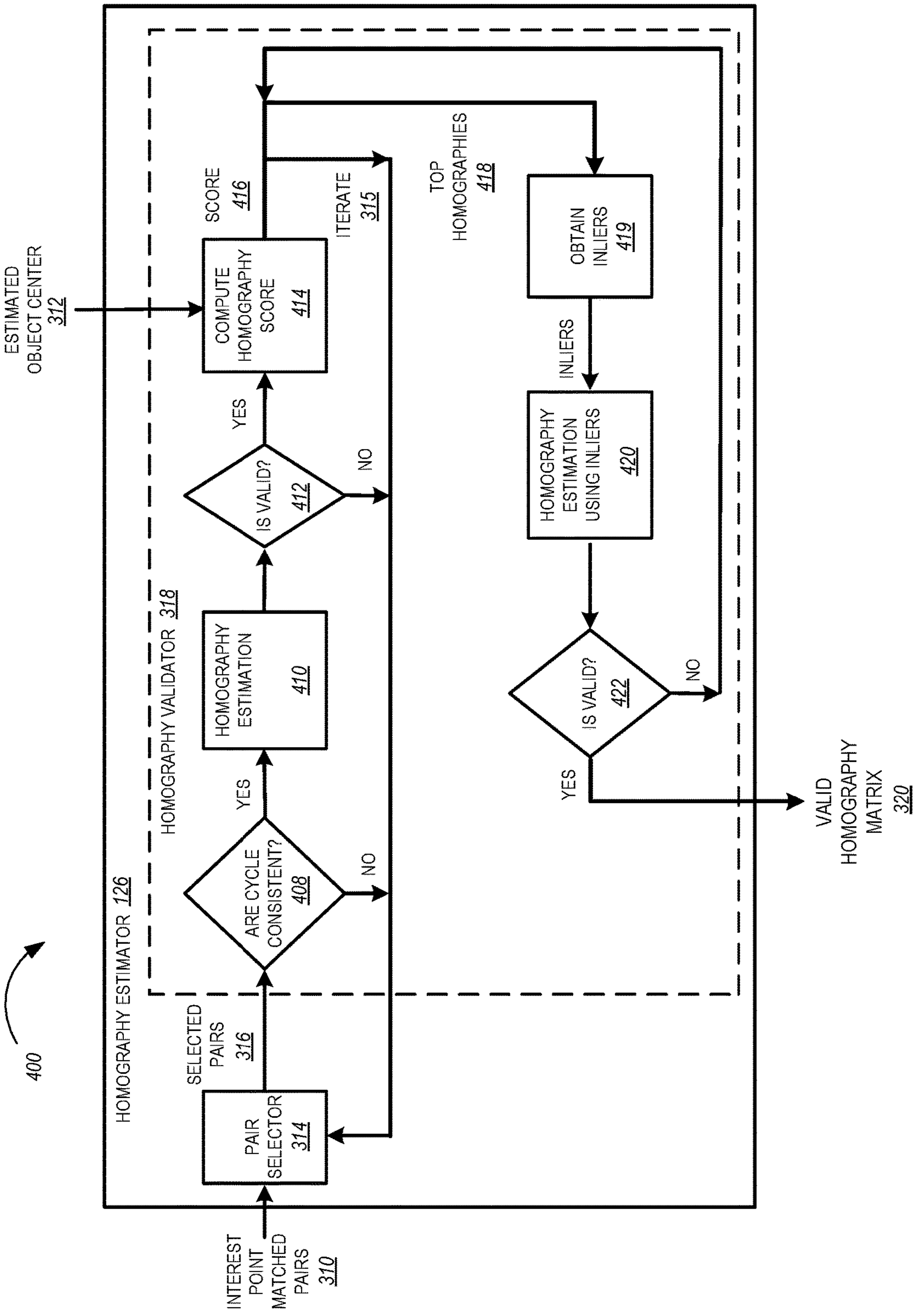
FIG. 4 is a flow diagram of an example process for homography estimation.

FIG. 4 shows a process 400 of homography estimation performed by the homography estimator 126. The homography estimator 126 receives interest point matched pairs 310. The pair selector 314 picks random matched pairs 316. For example, in each iteration 315, the homography estimator may randomly select four pairs of matched interest points. As an example, the homography estimator may select matched pairs including interest points P1R, P2R, P3R, and P4R from the reference image 110 matched with interest points P1 S, P3S, P3S, and P4S from the sample image, respectively. The four pairs of selected matched interest points can thus be represented as (P1R,P1S), (P2R,P2S), (P3R, P3S), and (P4R, P4S).

The homography validator 318 determines whether selected pairs 406 are cycle consistent 408. The homography validator 318 can test the selected pairs 406 for cyclic consistency by determining whether the order of the points is the same in the reference image 110 and in the sample image 130. For example, if an order of points in a clockwise direction around the reference image 110 is P1R, P3R, P4R, P2R, then a consistent order in the sample image 130 would be P1 S, P3S, P4S, P2S. If the selected pairs 406 are not cycle consistent 408, the selected pairs are discarded, and another set of pairs is selected.

If the selected pairs are cycle consistent, the homography validator 318 performs homography estimation 410. During homography estimation 410, a homography matrix is estimated using the selected four pairs of matched points.

The estimated homography is validated 412 before being accepted. The homography validator 318 validates the estimated homography by imposing a number of constraints.

An example constraint can be to verify that corner points of the shape of the object 105 are all located within the sample image 130. To validate the projected shape, the corners of object 105 are projected from the reference image 110 to the sample image 130. For the homography to be valid all projected corner points should be positive, e.g., should be located inside the sample image 130.

Another example constraint can be to verify that the size of the object meets size criteria. For example, the size of the object can be compared to a minimum size. The minimum size may be, for example, 3000 pixels, 2500 pixels, or 2000 pixels.

Another example constraint can be to verify that the shape of the object is convex. The shape is convex if, for any two points in the shape, the straight line segment joining them lies entirely within the shape.

If any of the constraints are not satisfied, the homography is invalidated, the selected pairs are discarded, and new pairs are selected. If the constraints are satisfied, homography estimation is valid 412, and the homography validator 318 computes 414 a homography score 416.

For valid homographies, the homography score 416 is computed for the estimated homography for the selected pairs. The score can include multiple elements.

An example element of the homography score 416 is normalized center error. To determine normalized center error, the center of the object shape is estimated based on identified corners of the shape. The estimated center of the shape is compared with the estimated object center 312 that was computed by the center estimator 124 using all of the interest point matched pairs 310. The error between the center of the shape based on the selected pairs and the estimated object center 312 can be measured, for example, as a distance in pixels. The error is then normalized by the largest diagonal of the shape. Thus, the normalized center error is a value less than 1.0. A normalized center error close to 0.0 results in a higher score, while the score decreases as the normalized center error trends away from 0.0.

Another example element of the homography score 416 is a size ratio. The homography estimator 126 may receive input indicating a size of the object 105 from previous localizations. For example, the size of the object 105 from previous localizations can include an area of the object as measured in square pixels. In another example, the size of the object 105 from previous localizations can include one or more dimensions of the object as measured in pixels. A size ratio is determined between the current object size based on the estimated homography, and the previous object size. The size ratio is computed by dividing the smaller value by the larger value, so that the resulting ratio is less than 1.0. A size ratio close to 1.0 results in a higher score, while the score decreases as the size ratio trends away from 1.0.

Another example element of the homography score 416 is a side ratio. A side ratio can be computed for an object having a polygon shape with parallel sides of similar length. For example, a side ratio can be computed for both pairs of parallel sides of a rectangular object, such as the doormat. A side ratio can also be computed for a parallelogram, a hexagon, an octagon, etc. The side ratio is a ratio between the lengths of parallel sides of the polygon. The side ratio is computed by dividing the smaller value by the larger value, so that the resulting side ratio is less than 1.0. A side ratio close to 1.0 results in a higher score, while the score decreases as the ratio trends away from 1.0.

The side ratio can be computed for multiple pairs of sides of the shape. For example, for a polygon with N sides, where N is an even number, the side ratio can be computed for N/2 pairs of parallel sides. As an example, for an object with a regular hexagon shape (N=6), the side ratio can be computed for each of N/2=3 pairs of parallel sides.

Another example element of the homography score 416 is an inlier ratio. To determine the inlier ratio, interest points from the reference image 110 are projected to the sample image 130 using the estimated homography matrix. A projection error is computed between the projected interest points and the respective matched interest points in the sample image 130. Inliers can be defined as the interest points for which the projection error meets criteria. For example, the projection error may meet criteria if the projection error is below a threshold, e.g., two pixels, three pixels, or five pixels. The ratio of the number of inliers to the total number of matched points is the inlier ratio. Thus, the inlier ratio is a value less than 1.0. An inlier ratio close to 1.0 results in a higher score, while the score decreases as the ratio trends away from 1.0.

To compute 414 the score 416, a weighted sum of the score elements is computed. The weights are positive values that add to 1.0. Equation 1 is an example equation for calculating the score. In Equation 1, below, N is the number of sides of the polygon.

Equation 1

$$\text{Score} = W1 \times (1 - \text{normalized\_center\_error}) + W2 \times (\text{size\_ratio}) + W3 \times \left(\frac{2}{N} \times \left(\sum_{i}^{N/2} \text{sidei\_ratio}\right) + W4 \times (\text{inlier\_ratio})\right.$$

Though the described example score includes four elements, the score can include more or fewer elements, in any combination. For example, in some cases the score may be calculated using the elements of normalized center ratio, size ratio, and inlier ratio, but might not include the element of side ratio. In some cases the score may be calculated using elements of normalized center ratio and inlier ratio, but might not include size ratio or side ratio.

The process of selecting matched pairs and computing homography scores is iterated 315, e.g., 1,000 times, 2,000, times, or 3,000 times. After performing the iterative RANSAC process, top homographies 418 are selected based on the homography scores. For example the homography validator 318 may select the top five estimated homographies with the highest scores. These top homographies 418 then go through additional stages of refinement and validation.

For each of the top homographies 418, the homography validator 318 obtains inliers 419. As described above, inliers are the interest points for which the projection error meets criteria. The homography validator 318 then performs homography estimation 420 using the inliers 419. The homography matrix is re-estimated using the inlier matched points.

The homography validator 318 determines if the homography estimation is valid 422 using the same validation process as in step 412. If none of the top five estimates result in a valid refined homography, no result is returned. Such a situation may occur if not enough correct matched pairs are found. For example, not enough correct matched pairs may be found when the photometric conditions of the sample image are poor, when the object in the sample image is far from the camera 102, or when the object 105 is not found in the area of interest. If the homography estimation is not valid, then no solution is found and the homography validator 318 does not output a homography matrix. In some examples, if the homography estimation is not valid, another set of top homographies 418 are selected to undergo the process of validation and refinement as described in steps 419, 420, and 422.

If the homography estimation is valid, the homography estimator 126 outputs the valid homography matrix 320. The valid homography matrix 424 is provided to the homographic transformer 322. The homographic transformer 322 uses the valid homography matrix 424 to project the reference image of the object to the sample image in order to obtain the object location 140. The object location 140 includes the estimated center location and the projection of the object corners to the sample image 130.

Figure 5:
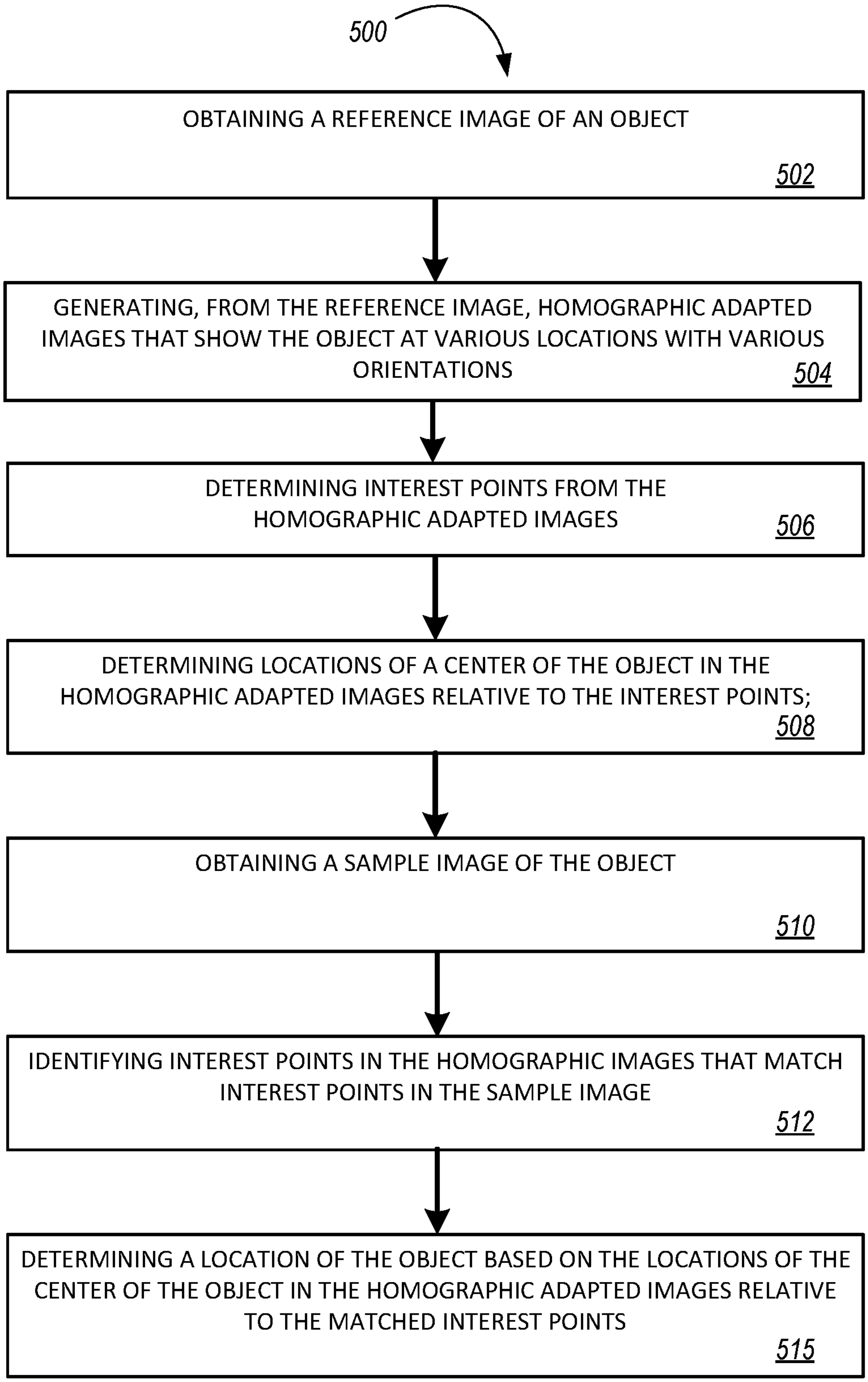
FIG. 5 is a flow diagram of an example process for object localization in video.

FIG. 5 is a flow diagram of an example process 500 for object localization in video. The process 500 can be performed by a computing system, e.g., the camera 102. In some implementations, the process 500 can be performed by another computing system, e.g., a control unit or a monitoring server of a property monitoring system. In some implementations, a first computer may perform certain actions of the process 500, and a second computer may perform certain other actions of the process 500. For example, a first computer may perform steps 502 through 508, and a second computer may perform steps 510 to 515.

The process 500 includes obtaining a reference image of an object (502). For example, the camera 102 obtains the reference image 110 of the object 105.

The process 500 includes generating, from the reference image, homographic adapted images that show the object at various locations with various orientations (504). For example, the homographic adaptor 112 generates, from the reference image 110, the homographic adapted images 202. The homographic adapted images 202 show the object 105 at various locations, orientations, and distances with respect to the camera.

In some implementations, the homographic adapted images 202 may be adapted by a photometric adaptor 114. The photometric adaptor generates photometric adapted images 204. The photometric adapted images 204 show the object 105 with various illumination levels, brightness, contrast, etc.

The process 500 includes determining interest points from the homographic adapted image (506). For example, the interest point extractor 116 determines interest points 206 from the homographic and photometric adapted images 204.

The process 500 includes determining locations of a center of the object in the homographic adapted images relative to the interest points (508). For example, the center mapper 220 determines relative center locations 214 of the object 105 relative to each of the interest points 206.

The process 500 includes obtaining a sample image of the object (510). For example, the camera 102 obtains the sample image 130 of the object 105.

The process 500 includes identifying interest points in the homographic images that match interest points in the sample image (512). For example, the interest point matcher 122 identifies interest points in the object representation 120 that match the sample image interest points 304, where the object representation 120 was generated based on the homographic adapted images 202.

The process 500 includes determining a location of the object based on the locations of the center of the object in the homographic adapted images relative to the matched interest points (515). For example, the localization engine 115 determines the object location 140 based on the estimated object center 312 relative to the matched interest points of the interest point matched pairs 310.

Figure 6:
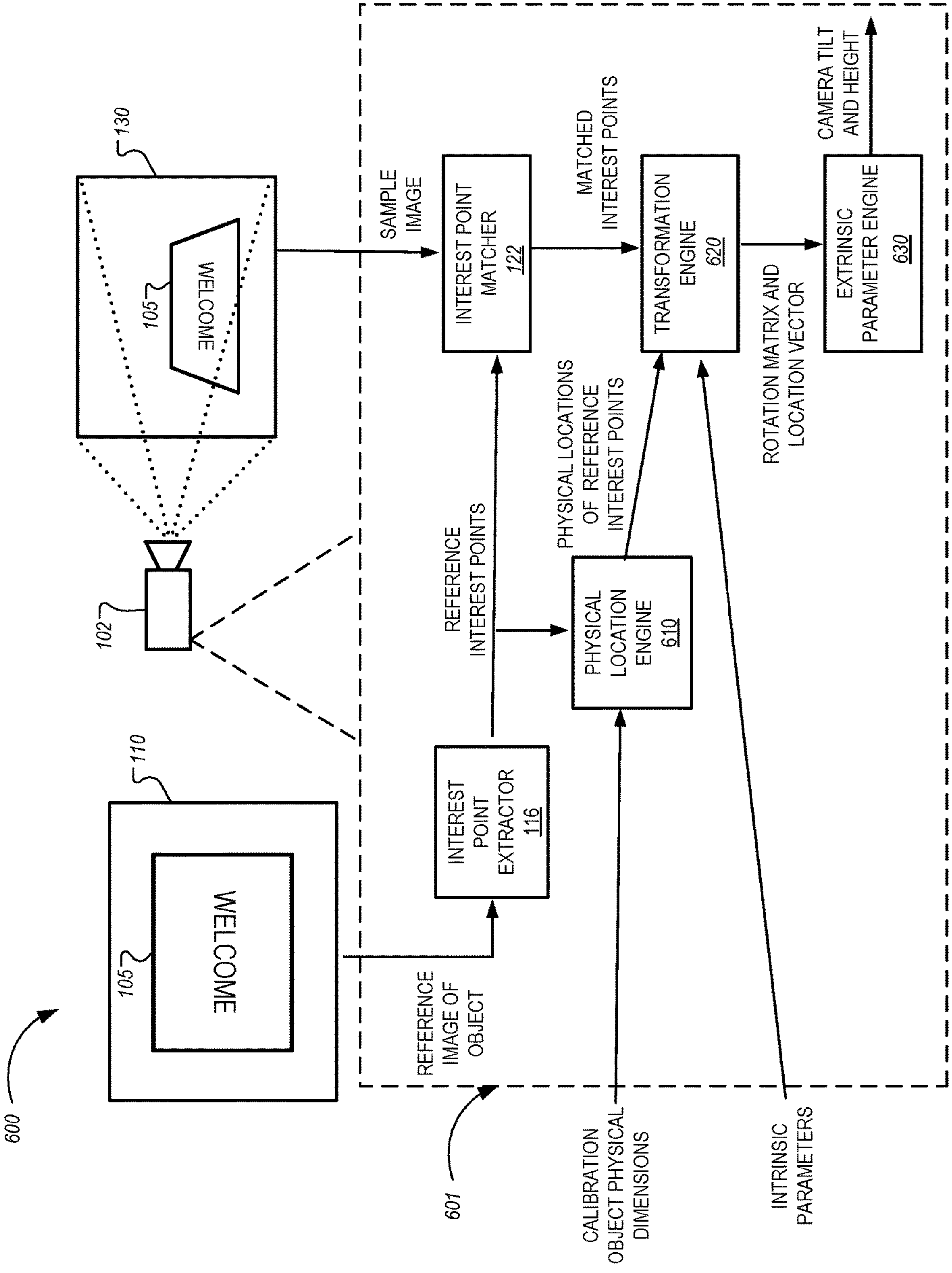
FIG. 6 is an example environment for extrinsic camera calibration using a calibration object.

FIG. 6 is an example environment 600 for extrinsic camera calibration using the object 105. For example, extrinsic camera calibration may be used to determine the height and tilt angle of the camera 102. Briefly, and as will be described in more detail below, the environment 600 includes the camera 102 that captures the sample image 130. The environment 600 includes a system 601 that can determine extrinsic camera parameters using an image of the calibration object 105 captured by the camera 102. The camera 102, the system 601, or a combination of both, may include the interest point extractor 116 that extracts interest points from a reference image 110, the interest point matcher 122 that matches interest points between the reference image 110 and the sample image 130, a physical location engine 610 that determines physical locations of interest points, a transformation engine 620 that determines a transformation between coordinate systems, and an extrinsic parameter engine 630 that determines a camera tilt and height of the camera.

While the interest point extractor 116, the interest point matcher 122, the physical location engine 610, the transformation engine 620, and the extrinsic parameter engine 630 are shown in the camera 102, they may alternatively be included in a control unit installed in a house that receives images from the camera, or may be included in a server remote from the house that receives images from the camera.

The reference image 110 may be an image of a calibration object where a camera is centered above the calibration object and a tilt angle of the camera is ninety degrees from the horizon, where the calibration object fills the entirety of the reference image 110. For example, the reference image 110 may be an image of a rectangular doormat, where the center of the camera is directly above the center of the doormat, and the doormat is flat on the ground and the camera is facing directly towards the ground.

Figure 7:
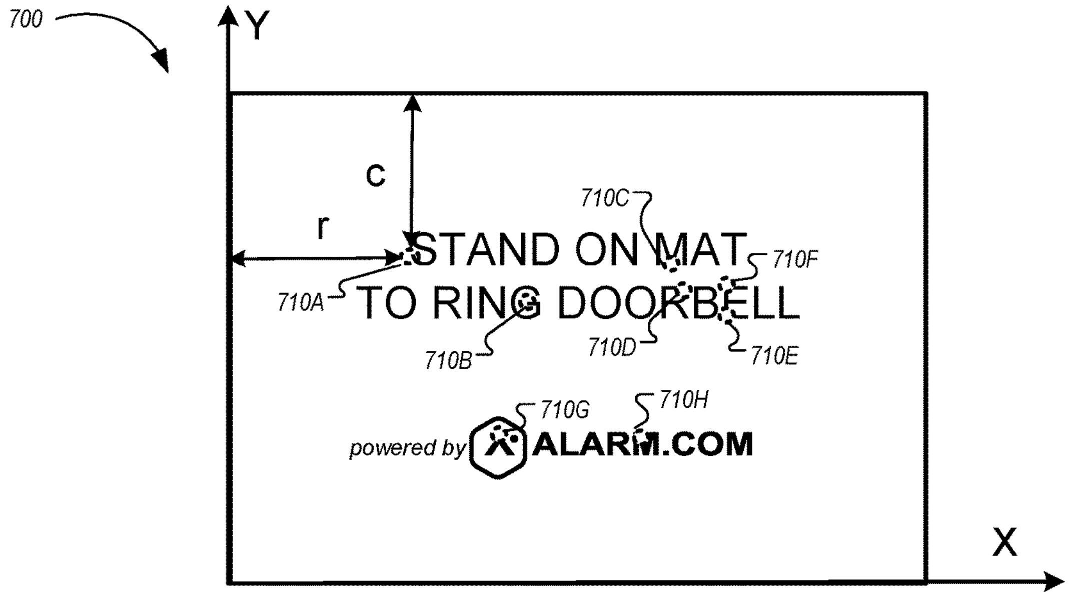
FIG. 7 illustrates a calibration object in a calibration object centered coordinate system.

FIG. 7 illustrates a calibration object in a calibration object centered coordinate system 700. As described above, the interest point extractor 116 may extract reference interest points from the reference image 110. For example, the interest point extractor 116 may extract interest points 710A-H from the reference image 110. The interest point extractor 116 may output pixel locations of each of the reference interest points. For example, the interest point extractor 116 may output a pixel location of (r, c) paired with a grayscale value of the pixel location to represent the interest point 710A with a center that is at row r and column c in the reference image 110.

As described above, the interest point matcher 122 may match the reference interest point from the reference image 110 with interest points from the sample image 130. For example, the interest point matcher 122 may match each of the reference interest points 710A-710H with a corresponding interest point in the sample image 130.

The physical location engine 610 may determine physical locations of the reference interest points. For example, the physical location engine 610 may determine a physical location (x, y) of the interest point 710A in a mat centered coordinate system, where the mat centered coordinate system has an origin in a lower left corner of the mat, a Y axis is parallel and along a left side of the mat, and a X axis is parallel and along a bottom side of the mat.

The physical location engine 610 may receive calibration object physical dimensions and pixel locations of reference interest points, and determine the physical locations of the reference interest points based on the pixel locations. For example, the dimension in pixels (width, height) of the reference image is (W, H). The physical measure (width, height) in inches of the calibration object is ($D_w$, $D_h$). An interest point is at pixel location (r, c). The interest point's physical location ($a_x$, $a_y$) in the mat centered coordinate system as shown can be determined using Equation 2, below.

$$\begin{cases} a_x = \frac{c}{W} \cdot D_w \\ a_y = \frac{H-r}{H} \cdot D_h \end{cases}$$ Equation 2

$$\{a^k = (a_x^k, a_y^k)\}_{k=1}^N$$

is the physical locations of the set of N interest points in the mat centered coordinate system computed using Equation 2 above.

The transformation engine 620 can determine a transformation from the physical locations of reference interest points and the pixel locations of interest points in the sample image that match the reference interest points. For example, the transformation engine 620 may obtain the physical locations of the reference interest points 710A-H, obtain the pixel locations of eight interest points in the sample image 130 that each match one of the reference interest points, obtain intrinsic camera parameters of focal lengths in pixels, the image location of the principal point of the camera, and the skew factor of the pixels, and output a rotation matrix and location vector.

Figure 8:
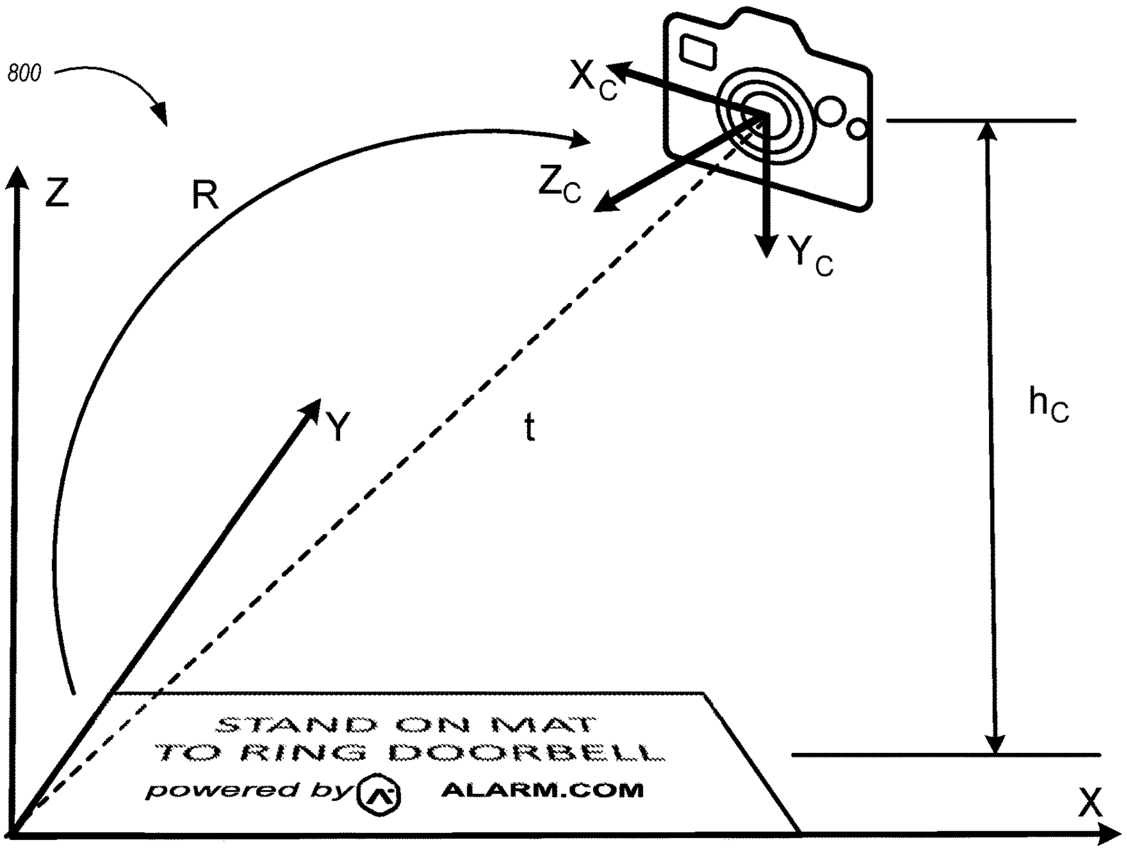
FIG. 8 illustrates an example of a transformation between coordinate systems.

FIG. 8 illustrates an example of a transformation 800 between coordinate systems. The transformation may be from the calibration object centered coordinate system represented with the axes X, Y, Z to the camera centered coordinate system represented by the axes XC, YC, ZC. For example, an origin of the camera centered coordinate system may be in a center of the camera lens, ZC may be along a center of a field of view of a camera lens, XC may be parallel to the ground and perpendicular to ZC, and YC may be perpendicular to the ground and perpendicular to ZC.

The transformation may be represented by a rotation matrix R that indicates rotation from the calibration object centered coordinate system to a camera centered coordinate system and a location vector t that indicates a translation from the calibration object centered coordinate system to the camera centered coordinate system. The Z axis of the calibration object centered coordinates system may be always pointing upwards perpendicular to a surface of the calibration object.

The transformation engine 620 may determine a transformation from the calibration object centered coordinate system to the camera centered coordinate system based on Equations 3-7, below.

$$(r_1 \ \ r_2 \ \ t)\begin{pmatrix} a_x^k \\ a_y^k \\ 1 \end{pmatrix} = K^{-1}\begin{pmatrix} p_x^k \\ p_y^k \\ 1 \end{pmatrix}, k = 1, \ldots , N$$ Equation 3

$$r_1^T \cdot r_2 = 0$$ Equation 4

$$r_1^T \cdot r_1 = 1$$ Equation 5

$$r_2^T \cdot r_2 = 1$$ Equation 6

$$r_1 \times r_2 = r_3$$ Equation 7

$$\{a^k = (a_x^k, a_y^k)\}_{k=1}^N$$

is the physical locations of the set of interest points in the calibration object centered coordinate system and K is the camera matrix, encoding the intrinsic camera parameters, including for example the focal lengths in pixels, the image location of the principal point of the camera, and sometimes the skew factor of the pixels. The $$\{p^k = (p_x^k, p_y^k)\}_{k=1}^N$$

is the pixel locations of the interest points in the sample image 130 captured by the camera 102. The transformation engine 620 may find initial solutions using direct linear transformation based on Equation 3, and then optimize the solution using non-linear least square methods on all Equations 3-7.

The extrinsic parameter engine 630 may receive the rotation matrix R and the location vector t from the transformation engine 620 and determine the camera tilt and height. For example, the extrinsic parameter engine 630 may determine that a camera is ten feet above the ground and is angled sixty degrees downwards from the horizon.

The extrinsic parameter engine 630 may determine the camera tilt and height using Equation 8, below.

$$\begin{cases} h_c = -r_3^T t \\ \theta_c = \arccos\left(r_z^3\right) - \frac{\pi}{2} \end{cases} \quad \text{Equation 8}$$

where $h_C$ represents the camera mount height, angle $\theta_c$ represents the tilt angle of the camera, e.g., angle of the camera looking direction $Z_c$ tilted down away from the horizon, and $r_3$ and $r^3$ are the third column and third row of the rotation matrix R, respectively, and $$r_z^3$$

is the third element of $r^3$.

In some implementations, the system 601 may more accurately determine extrinsic camera parameters using multiple images of a calibration object captured by the camera 102. For example, the camera 102 may obtain ten images of the object 105 and then determine the height and camera tilt based on all ten images.

The transformation engine 620 may assume that between all the images of the calibration object captured by the camera 102, the camera height and camera tilt will be constant. Accordingly, the transformation engine 620 may determine the rotation matrix and location vectors that are used to determine the extrinsic parameters using Equations 8-15, below.

$$(r_1 \;\; r_2 \;\; t)\begin{pmatrix} a_x^k \\ a_y^k \\ 1 \end{pmatrix} = K^{-1}\begin{pmatrix} p_x^k \\ p_y^k \\ 1 \end{pmatrix}, k = 1, \ldots , N_i, i = 1, \ldots , N \quad \text{Equation 8}$$

$$r_1^{i^T} \cdot r_2^i = 0 \quad \text{Equation 10}$$

$$r_1^{i^T} \cdot r_1^i = 1 \quad \text{Equation 11}$$

$$r_2^{i^T} \cdot r_2^i = 1 \quad \text{Equation 12}$$

$$r_1^i \times r_2^i = r_3^i \quad \text{Equation 13}$$

$$r_3^i = r_3^j, \forall\, i \neq j \quad \text{Equation 14}$$

$$r_3^{i^T} t^i = r_3^{j^T} t^j, \forall\, i \neq j \quad \text{Equation 15}$$

$$\{I_i\}_{i=1}^N$$

is the set of images showing the calibration object, $$R^i = \left(r_1^i, r_2^i, r_3^i\right)$$

is the rotation matrix that indicates a rotation from the calibration object centered coordinate system in the image $I_i$ to the camera centered coordinate system, and $t^i$ is the location vector that indicates a translation from the calibration object centered coordinate system in the image $I_i$ to the camera centered coordinate system.

Equations 14 and 15 establish dependencies among the set of camera-calibration object Euclidean transformations for different images, since the vertical direction of the calibration object center coordinate system may always pointing up and the camera mount height may be fixed, no matter where the calibration object is placed on the ground.

The system 601 can include several different functional components, including the interest point extractor 116, the interest point matcher 122, the physical location engine 610, the transformation engine 620, and the extrinsic parameter engine 630. The interest point extractor 116, the interest point matcher 122, the physical location engine 610, the transformation engine 620, or the extrinsic parameter engine 630, or a combination of these, can include one or more data processing apparatuses, can be implemented in code, or a combination of both. For instance, each of the interest point extractor 116, the interest point matcher 122, the physical location engine 610, the transformation engine 620, and the extrinsic parameter engine 630 can include one or more data processors and instructions that cause the one or more data processors to perform the operations discussed herein.

The various functional components of the system 601 may be installed on one or more computers as separate functional components or as different modules of a same functional component. For example, the components including the interest point extractor 116, the interest point matcher 122, the physical location engine 610, the transformation engine 620, and the extrinsic parameter engine 630 of the system 601 can be implemented as computer programs installed on one or more computers in one or more locations that are coupled to each through a network. In cloud-based systems for example, these components can be implemented by individual computing nodes of a distributed computing system.

Figure 9:
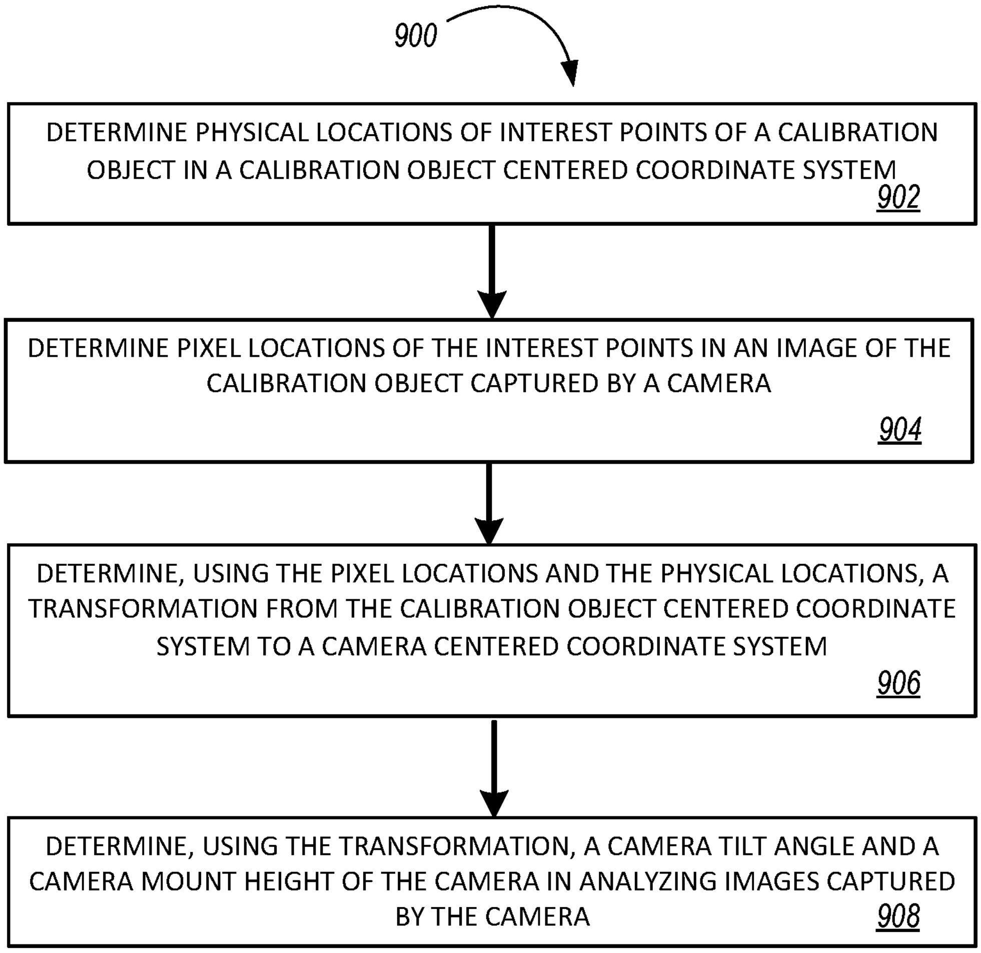
FIG. 9 illustrates a flow diagram of an example process for extrinsic camera calibration using a calibration object.

FIG. 9 illustrates a flow diagram of an example process 900 for extrinsic camera calibration using a calibration object. For example, the process 900 can be performed by the camera 102, the system 601, or a combination of both, in the environment 600 as shown in FIG. 6. Briefly, and as will be described in more detail below, the process 900 may include determining physical locations of interest points of a calibration object in a calibration object centered coordinate system (902), determining pixel locations of the interest points in an image of the calibration object captured by a camera (904), determining, using the pixel locations and the physical locations, a transformation from the calibration object centered coordinate system to a camera centered coordinate system (906), and determining, using the transformation, a camera tilt angle and a camera mount height of the camera for use in analyzing images captured by the camera (908).

The process 900 includes determining physical locations of interest points of a calibration object in a calibration object centered coordinate system (902). For example, the interest point extractor 116 may extract twenty interest points from a reference image 110 and the physical location engine 610 may determine twenty physical locations, in a doormat centered coordinate system, of the twenty respective interest points.

In some implementations, the system can obtain the physical dimension of the calibrated object. The system can obtain pixel locations of the interest points in a reference image, and the reference image can be captured with a second camera that is centered above the calibration object, and the calibration object can fill an entirety of the reference image. For example, the reference image can be captured with a second camera that is at a tilt angle of ninety degrees from the horizon. The system can determine the physical locations of the interest points using the physical dimension of the calibrated object and the pixel locations of the interest points in the reference image.

For example, the system can obtain height and width of the doormat 105. The system can obtain a reference image 110 captured with a second camera that is centered above the doormat 105. The second camera can be at a tilt angle of ninety degrees from horizon above the doormat 105. The system can determine the pixel locations of the interest points in the reference image. The system can determine the physical locations of the interest points using the height and width of the doormat 105 and the pixel locations of the interest points in the reference image.

The process 900 includes determining pixel locations of the interest points in an image of the calibration object captured by a camera (904). For example, the interest point matcher 122 may determine twenty interest points in the sample image 130 that match the respective twenty interest points in the reference image 110. Thus, the system can determine the pixel locations of the twenty matched interest points in the sample image 130 of the doormat 105.

In some implementations, the system can match one or more of the interest points in the calibrated object centered coordinate system with a corresponding interest point in the image of the calibrated object captured by the camera. In some implementations, each interest point can be associated with one or more descriptors, and matching the one or more of the interest points can include matching the one or more of the interest points in the calibrated object centered coordinate system with the corresponding interest point in the image of the calibrated object using a similarity of the respective associated one or more descriptors.

The process 900 includes determining, using the pixel locations and the physical locations, a transformation from the calibration object centered coordinate system to a camera centered coordinate system (906). The transformation can be parameters for a coordinate transformation from the calibration object centered coordinate system to a camera centered coordinate system.

In some implementations, the system can determining, using the pixel locations and the physical locations, a rotation matrix that indicates a rotation from the calibration object centered coordinate system to the camera centered coordinate system, and can determine, using the pixel locations and the physical locations, a location vector that indicates a translation from the calibration object centered coordinate system to the camera centered coordinate system. The rotation matrix and the location vector can determine the transformation from the calibration object centered coordinate system to a camera centered coordinate system. For example, the transformation can include a rotation matrix R and a translation vector t that defines the coordinate translation from the doormat centered (X, Y, Z) coordinate system to the camera centered (XC, YC, ZC) coordinate system in FIG. 8.

In some implementations, the system can obtain intrinsic camera parameters of the camera, and the system can determine the transformation using the pixel locations, the physical locations, and the intrinsic camera parameters. For example, the intrinsic camera parameters can include at least one of: a focal length, a location of a principal point of the camera, or a skew factor.

For example, the transformation engine 620 may receive the physical locations of reference interest points, pixels locations of matched interest points in the sample image 130, and intrinsic parameters of the camera 102, and determine a rotation matrix based on the physical locations of reference interest points, the pixels locations of matched interest points in the sample image 130, and the intrinsic parameters of the camera 102. The transformation engine 620 may receive the physical locations of reference interest points, pixels locations of matched interest points in the sample image 130, and intrinsic parameters of the camera 102, and determine a location vector based on the physical locations of reference interest points, the pixels locations of matched interest points in the sample image 130, and the intrinsic parameters of the camera 102.

In some implementations, the system can determine an initial solution using a linear transformation from the calibration object centered coordinate system to the camera centered coordinate system, and can determine the rotation matrix and the location vector by optimizing the initial solution using a non-linear least square method. For example, the transformation engine 620 may find initial solutions using direct linear transformation based on Equation 3, and then optimize the solution using non-linear least square methods on all Equations 3-7.

In some implementations, the system can obtain respective pixel locations of the interest points in at least one additional image of the calibration object captured by a camera. The system can determine, for each of the image and the at least one additional image, a respective transformation using: a) the pixel locations of the interest points in each image and the physical locations, and b) a relationship of the transformations among the image and the at least one additional image.

For example, the camera 102 may obtain ten images of the doormat 105 and then determine the height and camera tilt based on all ten images. The doormat 105 can be placed at different locations on the ground. Equations 14 and 15 depict the relationship among the set of Euclidean transformations for different images. That is, the doormat centered coordinate system is always pointing up, and the camera mounting height is fixed, no matter where the doormat is placed on the ground.

The process 900 includes determining, using the transformation, a camera tilt angle and a camera mount height of the camera for use in analyzing images captured by the camera (908). For example, the extrinsic parameter engine 630 may determine from the rotation matrix and location vector that the camera 102 is mounted ten feet above the doormat and is tilted downwards from the horizon at an angle of sixty degrees. These additional constraints can generate more accurate predictions for the transformation, e.g., the rotation matrix and the location vector.

In some implementations, the system can analyze a target image captured by the camera using the camera tilt angle and the camera mount height. In some implementations, analyzing the target image can include at least one of estimating a distance between the camera and an object depicted in the target image and localizing a footprint of the object.

The order of steps in the process 900 described above is illustrative only, and can be performed in different orders. In some implementations, the process 900 can include additional steps, fewer steps, or some of the steps can be divided into multiple steps.

Figure 10:
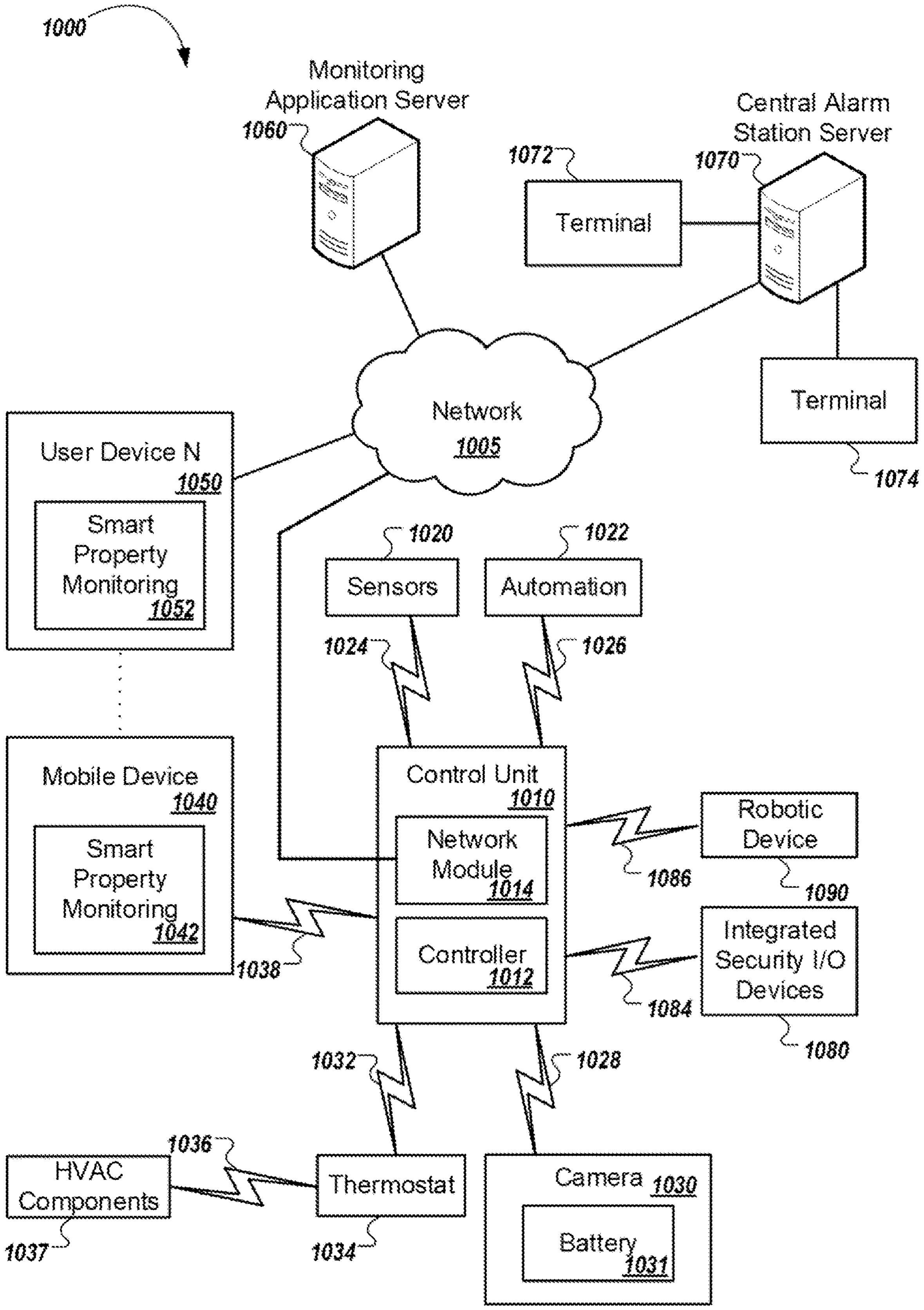
FIG. 10 is a diagram illustrating an example of a property monitoring system.

FIG. 10 is a diagram illustrating an example of a property monitoring system 1000. The property monitoring system 1000 includes a network 1005, a control unit 1010, one or more user devices 1040 and 1050, a monitoring application server 1060, and a central alarm station server 1070. In some examples, the network 1005 facilitates communications between the control unit 1010, the one or more user devices 1040 and 1050, the monitoring application server 1060, and the central alarm station server 1070. In some implementations, the interest point extractor 116, the interest point matcher 122, the physical location engine 610, the transformation engine 620, or the extrinsic parameter engine 630, or a combination of these, of FIG. 6 may be implemented in the control unit 1010 or the monitoring application server 1060, or a combination of both.

The network 1005 is configured to enable exchange of electronic communications between devices connected to the network 1005. For example, the network 1005 may be configured to enable exchange of electronic communications between the control unit 1010, the one or more user devices 1040 and 1050, the monitoring application server 1060, and the central alarm station server 1070. The network 1005 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 1005 may include multiple networks or subnetworks, each of which may include, for example, a wired or wireless data pathway. The network 1005 may include a circuit-switched network, a packet-switched data network, or any other network able to carry electronic communications (e.g., data or voice communications). For example, the network 1005 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 1005 may include one or more networks that include wireless data channels and wireless voice channels. The network 1005 may be a wireless network, a broadband network, or a combination of networks including a wireless network and a broadband network.

The control unit 1010 includes a controller 1012 and a network module 1014. The controller 1012 is configured to control a control unit monitoring system (e.g., a control unit system) that includes the control unit 1010. In some examples, the controller 1012 may include a processor or other control circuitry configured to execute instructions of a program that controls operation of a control unit system. In these examples, the controller 1012 may be configured to receive input from sensors, flow meters, or other devices included in the control unit system and control operations of devices included in the household (e.g., speakers, lights, doors, etc.). For example, the controller 1012 may be configured to control operation of the network module 1014 included in the control unit 1010.

The network module 1014 is a communication device configured to exchange communications over the network 1005. The network module 1014 may be a wireless communication module configured to exchange wireless communications over the network 1005. For example, the network module 1014 may be a wireless communication device configured to exchange communications over a wireless data channel and a wireless voice channel. In this example, the network module 1014 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 1014 also may be a wired communication module configured to exchange communications over the network 1005 using a wired connection. For instance, the network module 1014 may be a modem, a network interface card, or another type of network interface device. The network module 1014 may be an Ethernet network card configured to enable the control unit 1010 to communicate over a local area network and/or the Internet. The network module 1014 also may be a voice band modem configured to enable the alarm panel to communicate over the telephone lines of Plain Old Telephone Systems (POTS).

The control unit system that includes the control unit 1010 includes one or more sensors. For example, the monitoring system 1000 may include multiple sensors 1020. The sensors 1020 may include a lock sensor, a contact sensor, a motion sensor, or any other type of sensor included in a control unit system. The sensors 1020 also may include an environmental sensor, such as a temperature sensor, a water sensor, a rain sensor, a wind sensor, a light sensor, a smoke detector, a carbon monoxide detector, an air quality sensor, etc. The sensors 1020 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 1020 can include a radio-frequency identification (RFID) sensor that identifies a particular article that includes a pre-assigned RFID tag.

The control unit 1010 communicates with the module 1022 and a camera 1030 to perform monitoring. The module 1022 is connected to one or more devices that enable property automation, e.g., home or business automation. For instance, the module 1022 may be connected to one or more lighting systems and may be configured to control operation of the one or more lighting systems. Also, the module 1022 may be connected to one or more electronic locks at the property and may be configured to control operation of the one or more electronic locks (e.g., control Z-Wave locks using wireless communications in the Z-Wave protocol). Further, the module 1022 may be connected to one or more appliances at the property and may be configured to control operation of the one or more appliances. The module 1022 may include multiple modules that are each specific to the type of device being controlled in an automated manner. The module 1022 may control the one or more devices based on commands received from the control unit 1010. For instance, the module 1022 may cause a lighting system to illuminate an area to provide a better image of the area when captured by a camera 1030. The camera 1030 can include one or more batteries 1031 that require charging.

A drone 1090 can be used to survey the electronic system 1000. In particular, the drone 1090 can capture images of each item found in the electronic system 1000 and provide images to the control unit 1010 for further processing. Alternatively, the drone 1090 can process the images to determine an identification of the items found in the electronic system 1000.

The camera 1030 may be a video/photographic camera or other type of optical sensing device configured to capture images. For instance, the camera 1030 may be configured to capture images of an area within a property monitored by the control unit 1010. The camera 1030 may be configured to capture single, static images of the area or video images of the area in which multiple images of the area are captured at a relatively high frequency (e.g., thirty images per second) or both. The camera 1030 may be controlled based on commands received from the control unit 1010.

The camera 1030 may be triggered by several different types of techniques. For instance, a Passive Infra-Red (PIR) motion sensor may be built into the camera 1030 and used to trigger the camera 1030 to capture one or more images when motion is detected. The camera 1030 also may include a microwave motion sensor built into the camera and used to trigger the camera 1030 to capture one or more images when motion is detected. The camera 1030 may have a "normally open" or "normally closed" digital input that can trigger capture of one or more images when external sensors (e.g., the sensors 1020, PIR, door/window, etc.) detect motion or other events. In some implementations, the camera 1030 receives a command to capture an image when external devices detect motion or another potential alarm event. The camera 1030 may receive the command from the controller 1012 or directly from one of the sensors 1020.

In some examples, the camera 1030 triggers integrated or external illuminators (e.g., Infra-Red, Z-wave controlled "white" lights, lights controlled by the module 1022, etc.) to improve image quality when the scene is dark. An integrated or separate light sensor may be used to determine if illumination is desired and may result in increased image quality.

The camera 1030 may be programmed with any combination of time/day schedules, system "arming state", or other variables to determine whether images should be captured or not when triggers occur. The camera 1030 may enter a low-power mode when not capturing images. In this case, the camera 1030 may wake periodically to check for inbound messages from the controller 1012. The camera 1030 may be powered by internal, replaceable batteries, e.g., if located remotely from the control unit 1010. The camera 1030 may employ a small solar cell to recharge the battery when light is available. The camera 1030 may be powered by the controller's 1012 power supply if the camera 1030 is co-located with the controller 1012.

In some implementations, the camera 1030 communicates directly with the monitoring application server 1060 over the Internet. In these implementations, image data captured by the camera 1030 does not pass through the control unit 1010 and the camera 1030 receives commands related to operation from the monitoring application server 1060.

The system 1000 also includes thermostat 1034 to perform dynamic environmental control at the property. The thermostat 1034 is configured to monitor temperature and/or energy consumption of an HVAC system associated with the thermostat 1034, and is further configured to provide control of environmental (e.g., temperature) settings. In some implementations, the thermostat 1034 can additionally or alternatively receive data relating to activity at a property and/or environmental data at a property, e.g., at various locations indoors and outdoors at the property. The thermostat 1034 can directly measure energy consumption of the HVAC system associated with the thermostat, or can estimate energy consumption of the HVAC system associated with the thermostat 1034, for example, based on detected usage of one or more components of the HVAC system associated with the thermostat 1034. The thermostat 1034 can communicate temperature and/or energy monitoring information to or from the control unit 1010 and can control the environmental (e.g., temperature) settings based on commands received from the control unit 1010.

In some implementations, the thermostat 1034 is a dynamically programmable thermostat and can be integrated with the control unit 1010. For example, the dynamically programmable thermostat 1034 can include the control unit 1010, e.g., as an internal component to the dynamically programmable thermostat 1034. In addition, the control unit 1010 can be a gateway device that communicates with the dynamically programmable thermostat 1034. In some implementations, the thermostat 1034 is controlled via one or more module 1022.

A module 1037 is connected to one or more components of an HVAC system associated with a property, and is configured to control operation of the one or more components of the HVAC system. In some implementations, the module 1037 is also configured to monitor energy consumption of the HVAC system components, for example, by directly measuring the energy consumption of the HVAC system components or by estimating the energy usage of the one or more HVAC system components based on detecting usage of components of the HVAC system. The module 1037 can communicate energy monitoring information and the state of the HVAC system components to the thermostat 1034 and can control the one or more components of the HVAC system based on commands received from the thermostat 1034.

In some examples, the system 1000 further includes one or more robotic devices 1090. The robotic devices 1090 may be any type of robots that are capable of moving and taking actions that assist in security monitoring. For example, the robotic devices 1090 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 1090 may be robotic devices 1090 that are intended for other purposes and merely associated with the system 1000 for use in appropriate circumstances. For instance, a robotic vacuum cleaner device may be associated with the monitoring system 1000 as one of the robotic devices 1090 and may be controlled to take action responsive to monitoring system events.

In some examples, the robotic devices 1090 automatically navigate within a property. In these examples, the robotic devices 1090 include sensors and control processors that guide movement of the robotic devices 1090 within the property. For instance, the robotic devices 1090 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 1090 may include control processors that process output from the various sensors and control the robotic devices 1090 to move along a path that reaches the desired destination and avoids obstacles. In this regard, the control processors detect walls or other obstacles in the property and guide movement of the robotic devices 1090 in a manner that avoids the walls and other obstacles.

In addition, the robotic devices 1090 may store data that describes attributes of the property. For instance, the robotic devices 1090 may store a floorplan and/or a three-dimensional model of the property that enables the robotic devices 1090 to navigate the property. During initial configuration, the robotic devices 1090 may receive the data describing attributes of the property, determine a frame of reference to the data (e.g., a property or reference location in the property), and navigate the property based on the frame of reference and the data describing attributes of the property. Further, initial configuration of the robotic devices 1090 also may include learning of one or more navigation patterns in which a user provides input to control the robotic devices 1090 to perform a specific navigation action (e.g., fly to an upstairs bedroom and spin around while capturing video and then return to a property charging base). In this regard, the robotic devices 1090 may learn and store the navigation patterns such that the robotic devices 1090 may automatically repeat the specific navigation actions upon a later request.

In some examples, the robotic devices 1090 may include data capture and recording devices. In these examples, the robotic devices 1090 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 1090 to take and store a biometric sample that can be used to identify the person (e.g., a biometric sample with DNA that can be used for DNA testing).

In some implementations, the robotic devices 1090 may include output devices. In these implementations, the robotic devices 1090 may include one or more displays, one or more speakers, and/or any type of output devices that allow the robotic devices 1090 to communicate information to a nearby user.

The robotic devices 1090 also may include a communication module that enables the robotic devices 1090 to communicate with the control unit 1010, each other, and/or other devices. The communication module may be a wireless communication module that allows the robotic devices 1090 to communicate wirelessly. For instance, the communication module may be a Wi-Fi module that enables the robotic devices 1090 to communicate over a local wireless network at the property. The communication module further may be a 900 MHz wireless communication module that enables the robotic devices 1090 to communicate directly with the control unit 1010. Other types of short-range wireless communication protocols, such as Bluetooth, Bluetooth LE, Z-wave, Zigbee, etc., may be used to allow the robotic devices 1090 to communicate with other devices in the property. In some implementations, the robotic devices 1090 may communicate with each other or with other devices of the system 1000 through the network 1005.

The robotic devices 1090 further may include processor and storage capabilities. The robotic devices 1090 may include any suitable processing devices that enable the robotic devices 1090 to operate applications and perform the actions described throughout this disclosure. In addition, the robotic devices 1090 may include solid-state electronic storage that enables the robotic devices 1090 to store applications, configuration data, collected sensor data, and/or any other type of information available to the robotic devices 1090.

The robotic devices 1090 are associated with one or more charging stations. The charging stations may be located at predefined home base or reference locations in the property. The robotic devices 1090 may be configured to navigate to the charging stations after completion of tasks needed to be performed for the property monitoring system 1000. For instance, after completion of a monitoring operation or upon instruction by the control unit 1010, the robotic devices 1090 may be configured to automatically fly to and land on one of the charging stations. In this regard, the robotic devices 1090 may automatically maintain a fully charged battery in a state in which the robotic devices 1090 are ready for use by the property monitoring system 1000.

The charging stations may be contact based charging stations and/or wireless charging stations. For contact based charging stations, the robotic devices 1090 may have readily accessible points of contact that the robotic devices 1090 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 1090 may charge through a wireless exchange of power. In these cases, the robotic devices 1090 need only locate themselves closely enough to the wireless charging stations for the wireless exchange of power to occur. In this regard, the positioning needed to land at a predefined home base or reference location in the property may be less precise than with a contact based charging station. Based on the robotic devices 1090 landing at a wireless charging station, the wireless charging station outputs a wireless signal that the robotic devices 1090 receive and convert to a power signal that charges a battery maintained on the robotic devices 1090.

In some implementations, each of the robotic devices 1090 has a corresponding and assigned charging station such that the number of robotic devices 1090 equals the number of charging stations. In these implementations, the robotic devices 1090 always navigate to the specific charging station assigned to that robotic device. For instance, a first robotic device may always use a first charging station and a second robotic device may always use a second charging station.

In some examples, the robotic devices 1090 may share charging stations. For instance, the robotic devices 1090 may use one or more community charging stations that are capable of charging multiple robotic devices 1090. The community charging station may be configured to charge multiple robotic devices 1090 in parallel. The community charging station may be configured to charge multiple robotic devices 1090 in serial such that the multiple robotic devices 1090 take turns charging and, when fully charged, return to a predefined home base or reference location in the property that is not associated with a charger. The number of community charging stations may be less than the number of robotic devices 1090.

Also, the charging stations may not be assigned to specific robotic devices 1090 and may be capable of charging any of the robotic devices 1090. In this regard, the robotic devices 1090 may use any suitable, unoccupied charging station when not in use. For instance, when one of the robotic devices 1090 has completed an operation or is in need of battery charge, the control unit 1010 references a stored table of the occupancy status of each charging station and instructs the robotic device to navigate to the nearest charging station that is unoccupied.

The system 1000 further includes one or more integrated security devices 1080. The one or more integrated security devices may include any type of device used to provide alerts based on received sensor data. For instance, the one or more control units 1010 may provide one or more alerts to the one or more integrated security input/output devices 1080. Additionally, the one or more control units 1010 may receive sensor data from the sensors 1020 and determine whether to provide an alert to the one or more integrated security input/output devices 1080.

The sensors 1020, the module 1022, the camera 1030, the thermostat 1034, and the integrated security devices 1080 may communicate with the controller 1012 over communication links 1024, 1026, 1028, 1032, 1038, 1084, and 1086. The communication links 1024, 1026, 1028, 1032, 1038, 1084, and 1086 may be a wired or wireless data pathway configured to transmit signals from the sensors 1020, the module 1022, the camera 1030, the thermostat 1034, the drone 1090, and the integrated security devices 1080 to the controller 1012. The sensors 1020, the module 1022, the camera 1030, the thermostat 1034, the drone 1090, and the integrated security devices 1080 may continuously transmit sensed values to the controller 1012, periodically transmit sensed values to the controller 1012, or transmit sensed values to the controller 1012 in response to a change in a sensed value. In some implementations, the drone 1090 can communicate with the monitoring application server 1060 over network 1005. The drone 1090 can connect and communicate with the monitoring application server 1060 using a Wi-Fi or a cellular connection.

The communication links 1024, 1026, 1028, 1032, 1038, 1084, and 1086 may include a local network. The sensors 1020, the module 1022, the camera 1030, the thermostat 1034, the drone 1090 and the integrated security devices 1080, and the controller 1012 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 1060 is an electronic device configured to provide monitoring services by exchanging electronic communications with the control unit 1010, the one or more user devices 1040 and 1050, and the central alarm station server 1070 over the network 1005. For example, the monitoring application server 1060 may be configured to monitor events (e.g., alarm events) generated by the control unit 1010. In this example, the monitoring application server 1060 may exchange electronic communications with the network module 1014 included in the control unit 1010 to receive information regarding events (e.g., alerts) detected by the control unit 1010. The monitoring application server 1060 also may receive information regarding events (e.g., alerts) from the one or more user devices 1040 and 1050.

In some examples, the monitoring application server 1060 may route alert data received from the network module 1014 or the one or more user devices 1040 and 1050 to the central alarm station server 1070. For example, the monitoring application server 1060 may transmit the alert data to the central alarm station server 1070 over the network 1005.

The monitoring application server 1060 may store sensor and image data received from the monitoring system 1000 and perform analysis of sensor and image data received from the monitoring system 1000. Based on the analysis, the monitoring application server 1060 may communicate with and control aspects of the control unit 1010 or the one or more user devices 1040 and 1050.

The monitoring application server 1060 may provide various monitoring services to the system 1000. For example, the monitoring application server 1060 may analyze the sensor, image, and other data to determine an activity pattern of a resident of the property monitored by the system 1000. In some implementations, the monitoring application server 1060 may analyze the data for alarm conditions or may determine and perform actions at the property by issuing commands to one or more components of the system 1000, possibly through the control unit 1010.

The central alarm station server 1070 is an electronic device configured to provide alarm monitoring service by exchanging communications with the control unit 1010, the one or more mobile devices 1040 and 1050, and the monitoring application server 1060 over the network 1005. For example, the central alarm station server 1070 may be configured to monitor alerting events generated by the control unit 1010. In this example, the central alarm station server 1070 may exchange communications with the network module 1014 included in the control unit 1010 to receive information regarding alerting events detected by the control unit 1010. The central alarm station server 1070 also may receive information regarding alerting events from the one or more mobile devices 1040 and 1050 and/or the monitoring application server 1060.

The central alarm station server 1070 is connected to multiple terminals 1072 and 1074. The terminals 1072 and 1074 may be used by operators to process alerting events. For example, the central alarm station server 1070 may route alerting data to the terminals 1072 and 1074 to enable an operator to process the alerting data. The terminals 1072 and 1074 may include general-purpose computers (e.g., desktop personal computers, workstations, or laptop computers) that are configured to receive alerting data from a server in the central alarm station server 1070 and render a display of information based on the alerting data. For instance, the controller 1012 may control the network module 1014 to transmit, to the central alarm station server 1070, alerting data indicating that a sensor 1020 detected motion from a motion sensor via the sensors 1020. The central alarm station server 1070 may receive the alerting data and route the alerting data to the terminal 1072 for processing by an operator associated with the terminal 1072. The terminal

1072 may render a display to the operator that includes information associated with the alerting event (e.g., the lock sensor data, the motion sensor data, the contact sensor data, etc.) and the operator may handle the alerting event based on the displayed information.

In some implementations, the terminals 1072 and 1074 may be mobile devices or devices designed for a specific function. Although FIG. 10 illustrates two terminals for brevity, actual implementations may include more (and, perhaps, many more) terminals.

The one or more user devices 1040 and 1050 are devices that host and display user interfaces. For instance, the user device 1040 is a mobile device that hosts or runs one or more native applications (e.g., the smart property application 1042). The user device 1040 may be a cellular phone or a non-cellular locally networked device with a display. The user device 1040 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 1040 may perform functions unrelated to the monitoring system, such as placing personal telephone calls, playing music, playing video, displaying pictures, browsing the Internet, maintaining an electronic calendar, etc.

The user device 1040 includes a smart property application 1042. The smart property application 1042 refers to a software/firmware program running on the corresponding mobile device that enables the user interface and features described throughout. The user device 1040 may load or install the smart property application 1042 based on data received over a network or data received from local media. The smart property application 1042 runs on mobile devices platforms, such as iPhone, iPod touch, Blackberry, Google Android, Windows Mobile, etc. The smart property application 1042 enables the user device 1040 to receive and process image and sensor data from the monitoring system.

The user device 1050 may be a general-purpose computer (e.g., a desktop personal computer, a workstation, or a laptop computer) that is configured to communicate with the monitoring application server 1060 and/or the control unit 1010 over the network 1005. The user device 1050 may be configured to display a smart property user interface 1052 that is generated by the user device 1050 or generated by the monitoring application server 1060. For example, the user device 1050 may be configured to display a user interface (e.g., a web page) provided by the monitoring application server 1060 that enables a user to perceive images captured by the camera 1030 and/or reports related to the monitoring system. Although FIG. 10 illustrates two user devices for brevity, actual implementations may include more (and, perhaps, many more) or fewer user devices.

In some implementations, the one or more user devices 1040 and 1050 communicate with and receive monitoring system data from the control unit 1010 using the communication link 1038. For instance, the one or more user devices 1040 and 1050 may communicate with the control unit 1010 using various local wireless protocols such as Wi-Fi, Bluetooth, Z-wave, Zigbee, HomePlug (Ethernet over power line), or wired protocols such as Ethernet and USB, to connect the one or more user devices 1040 and 1050 to local security and automation equipment. The one or more user devices 1040 and 1050 may connect locally to the monitoring system and its sensors and other devices. The local connection may improve the speed of status and control communications because communicating through the network 1005 with a remote server (e.g., the monitoring application server 1060) may be significantly slower.

Although the one or more user devices 1040 and 1050 are shown as communicating with the control unit 1010, the one or more user devices 1040 and 1050 may communicate directly with the sensors and other devices controlled by the control unit 1010. In some implementations, the one or more user devices 1040 and 1050 replace the control unit 1010 and perform the functions of the control unit 1010 for local monitoring and long range/offsite communication.

In other implementations, the one or more user devices 1040 and 1050 receive monitoring system data captured by the control unit 1010 through the network 1005. The one or more user devices 1040, 1050 may receive the data from the control unit 1010 through the network 1005 or the monitoring application server 1060 may relay data received from the control unit 1010 to the one or more user devices 1040 and 1050 through the network 1005. In this regard, the monitoring application server 1060 may facilitate communication between the one or more user devices 1040 and 1050 and the monitoring system.

In some implementations, the one or more user devices 1040 and 1050 may be configured to switch whether the one or more user devices 1040 and 1050 communicate with the control unit 1010 directly (e.g., through link 1038) or through the monitoring application server 1060 (e.g., through network 1005) based on a location of the one or more user devices 1040 and 1050. For instance, when the one or more user devices 1040 and 1050 are located close to the control unit 1010 and in range to communicate directly with the control unit 1010, the one or more user devices 1040 and 1050 use direct communication. When the one or more user devices 1040 and 1050 are located far from the control unit 1010 and not in range to communicate directly with the control unit 1010, the one or more user devices 1040 and 1050 use communication through the monitoring application server 1060.

Although the one or more user devices 1040 and 1050 are shown as being connected to the network 1005, in some implementations, the one or more user devices 1040 and 1050 are not connected to the network 1005. In these implementations, the one or more user devices 1040 and 1050 communicate directly with one or more of the monitoring system components and no network (e.g., Internet) connection or reliance on remote servers is needed.

In some implementations, the one or more user devices 1040 and 1050 are used in conjunction with only local sensors and/or local devices in a house. In these implementations, the system 1000 includes the one or more user devices 1040 and 1050, the sensors 1020, the module 1022, the camera 1030, and the robotic devices, e.g., that can include the drone 1090. The one or more user devices 1040 and 1050 receive data directly from the sensors 1020, the module 1022, the camera 1030, and the robotic devices and send data directly to the sensors 1020, the module 1022, the camera 1030, and the robotic devices. The one or more user devices 1040, 1050 provide the appropriate interfaces/processing to provide visual surveillance and reporting.

In other implementations, the system 1000 further includes network 1005 and the sensors 1020, the module 1022, the camera 1030, the thermostat 1034, and the robotic devices are configured to communicate sensor and image data to the one or more user devices 1040 and 1050 over network 1005 (e.g., the Internet, cellular network, etc.). In yet another implementation, the sensors 1020, the module 1022, the camera 1030, the thermostat 1034, and the robotic devices are intelligent enough to change the communication pathway from a direct local pathway when the one or more user devices 1040 and 1050 are in close physical proximity to the sensors 1020, the module 1022, the camera 1030, the thermostat 1034, and the robotic devices to a pathway over network 1005 when the one or more user devices 1040 and 1050 are farther from the sensors 1020, the module 1022, the camera 1030, the thermostat 1034, and the robotic devices. In some examples, the system leverages GPS information from the one or more user devices 1040 and 1050 to determine whether the one or more user devices 1040 and 1050 are close enough to the sensors 1020, the module 1022, the camera 1030, the thermostat 1034, and the robotic devices to use the direct local pathway or whether the one or more user devices 1040 and 1050 are far enough from the sensors 1020, the module 1022, the camera 1030, the thermostat 1034, and the robotic devices that the pathway over network 1005 is required. In other examples, the system leverages status communications (e.g., pinging) between the one or more user devices 1040 and 1050 and the sensors 1020, the module 1022, the camera 1030, the thermostat 1034, and the robotic devices to determine whether communication using the direct local pathway is possible. If communication using the direct local pathway is possible, the one or more user devices 1040 and 1050 communicate with the sensors 1020, the module 1022, the camera 1030, the thermostat 1034, and the robotic devices using the direct local pathway. If communication using the direct local pathway is not possible, the one or more user devices 1040 and 1050 communicate with the sensors 1020, the module 1022, the camera 1030, the thermostat 1034, and the robotic devices using the pathway over network 1005.

In some implementations, the system 1000 provides end users with access to images captured by the camera 1030 to aid in decision-making. The system 1000 may transmit the images captured by the camera 1030 over a wireless WAN network to the user devices 1040 and 1050. Because transmission over a wireless WAN network may be relatively expensive, the system 1000 can use several techniques to reduce costs while providing access to significant levels of useful visual information (e.g., compressing data, down-sampling data, sending data only over inexpensive LAN connections, or other techniques).

In some implementations, a state of the monitoring system 1000 and other events sensed by the monitoring system 1000 may be used to enable/disable video/image recording devices (e.g., the camera 1030). In these implementations, the camera 1030 may be set to capture images on a periodic basis when the alarm system is armed in an "away" state, but set not to capture images when the alarm system is armed in a "stay" state or disarmed. In addition, the camera 1030 may be triggered to begin capturing images when the alarm system detects an event, such as an alarm event, a door-opening event for a door that leads to an area within a field of view of the camera 1030, or motion in the area within the field of view of the camera 1030. In other implementations, the camera 1030 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:

maintaining, in a virtual space and simulating an image capture by a camera, a projection of an image depicting a calibration object onto a field of view of the camera;

generating, using the projection of the image onto the field of view of the camera in the virtual space, two or more simulated views of the calibration object in the virtual space;

detecting, for each of the two or more simulated views in the virtual space, a plurality of interest points for the calibration object, at least some of the interest points for different simulated views from the two or more simulated views comprising different data;

aggregating, for each common interest point included in at least two of the plurality of interest points for the two or more simulated views in the virtual space and for the calibration object, data for the common interest point for the calibration object using the different data from the respective interest points that represent the common interest point;

selecting, from the plurality of interest points and using the aggregated data for the common interest points, a subset of interest points;

determining an estimated center location of the calibration object in the image using the subset of interest points, comprising:

generating candidate center locations using descriptors for multiple interest point matched pairs from the subset of interest points;

generating one or more clusters of the candidate center locations using a clustering algorithm; and identifying, from the one or more clusters, a centroid of a largest cluster as the estimated center location of the calibration object in the image;

determining physical locations of the subset of interest points of the calibration object in a calibration object centered coordinate system;

determining pixel locations of the subset of interest points in the image of the calibration object captured by the camera;

determining, using (i) the estimated center location of the calibration object, (ii) the pixel locations, and (iii) the physical locations, a transformation from the calibration object centered coordinate system to a camera centered coordinate system;

determining, using the transformation, a camera tilt angle and a camera mount height of the camera for use in analyzing images captured by the camera; and transmitting, to a monitoring system, a target image and data indicating the camera tilt angle and the camera mount height to cause the monitoring system to analyze the target image captured by the camera using the camera tilt angle and the camera mount height.

2. The method of claim 1, comprising:

generating a mapping by matching one or more of the subset of interest points in the calibrated object centered coordinate system with a corresponding interest point in the image of the calibrated object captured by the camera, wherein determining the transformation uses the mapping.

3. The method of claim 2, comprising:

generating, for at least some of the interest points, one or more descriptors that indicate distinguishable features of a region around the corresponding interest point, wherein:

matching the one or more of the subset of interest points comprises matching the one or more of the subset of interest points in the calibrated object centered coordinate system with the corresponding interest point in the image of the calibrated object using a similarity of the respective associated one or more descriptors that indicate the distinguishable features of the region around the corresponding interest point.

4. The method of claim 1, wherein determining the physical locations of the subset of interest points in the calibration object centered coordinate system comprises:

obtaining physical dimension of the calibrated object;

obtaining pixel locations of the subset of interest points in a reference image, wherein the reference image is captured with a second camera that is centered above the calibration object, wherein the calibration object fills an entirety of the reference image; and determining the physical locations of the subset of interest points using the physical dimension of the calibrated object and the pixel locations of the subset of interest points in the reference image.

5. The method of claim 1, wherein determining the transformation from the calibration object centered coordinate system to the camera centered coordinate system comprises:

determining an initial solution using a linear transformation from the calibration object centered coordinate system to the camera centered coordinate system;

determining, using the pixel locations and the physical locations, a rotation matrix that indicates a rotation from the calibration object centered coordinate system to the camera centered coordinate system; and determining, using the pixel locations and the physical locations, a location vector that indicates a translation from the calibration object centered coordinate system to the camera centered coordinate system, wherein determining the rotation matrix and the location vector comprises optimizing the initial solution using a non-linear least square method.

6. The method of claim 1, comprising:

analyzing the target image captured by the camera using the camera tilt angle and the camera mount height.

7. The method of claim 6, wherein analyzing the target image comprises at least one of estimating a distance between the camera and an object depicted in the target image and localizing a footprint of the object.

8. A system comprising one or more computers and one or more storage devices on which are stored instructions that are operable, when executed by the one or more computers, to cause the one or more computers to perform operations comprising:

maintaining, in a virtual space and simulating an image capture by a camera, a projection of an image depicting a calibration object onto a field of view of the camera;

generating, using the projection of the image onto the field of view of the camera in the virtual space, two or more simulated views of the calibration object in the virtual space;

detecting, for each of the two or more simulated views in the virtual space, a plurality of interest points for the calibration object, at least some of the interest points for different simulated views from the two or more simulated views comprising different data;

aggregating, for each common interest point included in at least two of the plurality of interest points for the two or more simulated views in the virtual space and for the calibration object, data for the common interest point for the calibration object using the different data from the respective interest points that represent the common interest point;

selecting, from the plurality of interest points and using the aggregated data for the common interest points, a subset of interest points;

determining an estimated center location of the calibration object in the image using the subset of interest points, comprising:

generating candidate center locations using descriptors for multiple interest point matched pairs from the subset of interest points;

generating one or more clusters of the candidate center locations using a clustering algorithm; and identifying, from the one or more clusters, a centroid of a largest cluster as the estimated center location of the calibration object in the image;

determining physical locations of the subset of interest points of the calibration object in a calibration object centered coordinate system;

determining pixel locations of the subset of interest points in the image of the calibration object captured by the camera;

determining, using (i) the estimated center location of the calibration object, (ii) the pixel locations, and (iii) the physical locations, a transformation from the calibration object centered coordinate system to a camera centered coordinate system;

determining, using the transformation, a camera tilt angle and a camera mount height of the camera for use in analyzing images captured by the camera; and transmitting, to a monitoring system, a target image and data indicating the camera tilt angle and the camera mount height to cause the monitoring system to analyze the target image captured by the camera using the camera tilt angle and the camera mount height.

9. The system of claim 8, the operations comprise:

generating, for at least some of the interest points, one or more descriptors that indicate distinguishable features of a region around a corresponding interest point; and generating a mapping by matching one or more of the subset of interest points in the calibrated object centered coordinate system with the corresponding interest point in the image of the calibrated object captured by the camera using a similarity of the respective associated one or more descriptors that indicate the distinguishable features of the region around the corresponding interest point.

10. The system of claim 8, wherein determining the physical locations of the subset of interest points in the calibration object centered coordinate system comprises:

obtaining physical dimension of the calibrated object;

obtaining pixel locations of the subset of interest points in a reference image, wherein the reference image is captured with a second camera that is centered above the calibration object, wherein the calibration object fills an entirety of the reference image; and determining the physical locations of the subset of interest points using the physical dimension of the calibrated object and the pixel locations of the subset of interest points in the reference image.

11. The system of claim 10, wherein the reference image is captured with the second camera that is at a tilt angle of ninety degrees from horizon.

12. The system of claim 8, the operations comprise:

obtaining intrinsic camera parameters; and determining the transformation using the pixel locations, the physical locations, and the intrinsic camera parameters.

13. The system of claim 8, wherein determining the transformation from the calibration object centered coordinate system to the camera centered coordinate system comprises:

determining an initial solution using a linear transformation from the calibration object centered coordinate system to the camera centered coordinate system;

determining, using the pixel locations and the physical locations, a rotation matrix that indicates a rotation from the calibration object centered coordinate system to the camera centered coordinate system; and determining, using the pixel locations and the physical locations, a location vector that indicates a translation from the calibration object centered coordinate system to the camera centered coordinate system, wherein determining the rotation matrix and the location vector comprises optimizing the initial solution using a non-linear least square method.

14. A non-transitory computer storage medium encoded with instructions that, when executed by one or more computers, cause the one or more computers to perform operations comprising:

maintaining, in a virtual space and simulating an image capture by a camera, a projection of an image depicting a calibration object onto a field of view of the camera;

generating, using the projection of the image onto the field of view of the camera in the virtual space, two or more simulated views of the calibration object in the virtual space;

detecting, for each of the two or more simulated views in the virtual space, a plurality of interest points for the calibration object, at least some of the interest points for different simulated views from the two or more simulated views comprising different data;

aggregating, for each common interest point included in at least two of the plurality of interest points for the two or more simulated views in the virtual space and for the calibration object, data for the common interest point for the calibration object using the different data from the respective interest points that represent the common interest point;

selecting, from the plurality of interest points and using the aggregated data for the common interest points, a subset of interest points;

determining an estimated center location of the calibration object in the image using the subset of interest points, comprising:

generating candidate center locations using descriptors for multiple interest point matched pairs from the subset of interest points;

generating one or more clusters of the candidate center locations using a clustering algorithm; and identifying, from the one or more clusters, a centroid of a largest cluster as the estimated center location of the calibration object in the image;

determining physical locations of the subset of interest points of the calibration object in a calibration object centered coordinate system;

determining pixel locations of the subset of interest points in the image of the calibration object captured by the camera;

determining, using (i) the estimated center location of the calibration object, (ii) the pixel locations, and (iii) the physical locations, a transformation from the calibration object centered coordinate system to a camera centered coordinate system;

determining, using the transformation, a camera tilt angle and a camera mount height of the camera for use in analyzing images captured by the camera; and transmitting, to a monitoring system, a target image and data indicating the camera tilt angle and the camera mount height to cause the monitoring system to analyze the target image captured by the camera using the camera tilt angle and the camera mount height.

15. The method of claim 3, wherein generating the one or more descriptors comprises, for at least some of the interest points:

generating, for at least some of the two or more simulated views, one or more first descriptors each of which is for a corresponding interest point from the plurality of interest points for the corresponding simulated view; and generating the one or more descriptors by aggregating, for each common interest point, descriptors from the one or more first descriptors that are for the common interest point.

16. The method of claim 1, comprising:

generating an object representation of the calibration object by projecting at least some of the simulated views of the calibration object onto the image, wherein:

determining the physical locations of the subset of interest points of the calibration object uses the object representation of the calibration object.

17. The method of claim 1, wherein:

generating the two or more simulated views of the calibration object comprises generating one or more homographic augmented views of the calibration object; and detecting the plurality of interest points for the calibration object comprises detecting, for each of the one or more homographic augmented views of the calibration object, the plurality of interest points for the calibration object.

18. The method of claim 1, wherein:

generating the two or more simulated views of the calibration object comprises generating one or more photometric augmented views of the calibration object; and detecting the plurality of interest points for the calibration object comprises detecting, for each of the one or more photometric augmented views of the calibration object, the plurality of interest points for the calibration object.

19. The method of claim 1, comprising:

computing, using the plurality of interest points for the two or more simulated views, a probability that an interest point is in separate ones of the plurality of interest points for a corresponding simulated view, wherein:

selecting the subset of interest points uses the probability that an interest point is in separate ones of the plurality of interest points for a corresponding simulated view.

20. The method of claim 1, comprising:

computing, using the plurality of interest points for the two or more simulated views, a frequency that an interest point is in separate ones of the plurality of interest points for a corresponding simulated view, wherein:

selecting the subset of interest points uses the frequency that an interest point is in separate ones of the plurality of interest points for a corresponding simulated view.

* * * * *